United States Patent
Yokomakura et al.

(10) Patent No.: US 12,047,800 B2
(45) Date of Patent: *Jul. 23, 2024

(54) TERMINAL DEVICE, BASE STATION DEVICE, COMMUNICATION METHOD, AND INTEGRATED CIRCUIT

(71) Applicant: SHARP KABUSHIKI KAISHA, Sakai (JP)

(72) Inventors: Kazunari Yokomakura, Sakai (JP); Tatsushi Aiba, Sakai (JP); Shoichi Suzuki, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

This patent is subject to a terminal disclaimer.

(21) Appl. No.: 17/500,226

(22) Filed: Oct. 13, 2021

(65) Prior Publication Data

US 2022/0039106 A1 Feb. 3, 2022

Related U.S. Application Data

(63) Continuation of application No. 15/749,843, filed as application No. PCT/JP2016/072825 on Aug. 3, 2016, now Pat. No. 11,178,562.

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0032* (2013.01); *H04L 5/0057* (2013.01);
(Continued)

(58) Field of Classification Search
CPC .............. H04W 24/10; H04W 72/1273; H04L 5/0032; H04L 5/0057; H04L 5/0082;
(Continued)

(56) References Cited

U.S. PATENT DOCUMENTS 10,306,501 B2 * 5/2019 Lee ........................... H04L 5/00
2012/0127869 A1 5/2012 Yin et al.
(Continued)

FOREIGN PATENT DOCUMENTS

CN 103037529 A 4/2013
EP 2456154 A2 5/2012
(Continued)

OTHER PUBLICATIONS

3GPP TS 36.211 V12.4.0 (Dec. 2014)Evolved Universal Terrestrial Radio Access (E-UTRA); Physical channels and modulation (Release 12) Valbonne—France.
(Continued)

*Primary Examiner* — Deepa Belur
(74) *Attorney, Agent, or Firm* — ScienBiziP, P.C.

(57) ABSTRACT

A terminal device configured to report CSI using multiple uplink cells. In a case that a total of the number of one or multiple first channel state information reports and multiple second channel state information reports in a first subframe exceeds a first certain number, a second certain number of channel state information reports of the one or multiple first channel state information reports and the multiple second channel state information reports are not updated. The second certain number is a number obtained by subtracting the first certain number from the total of the number of the one or multiple first channel state information reports and the number of the multiple second channel state information reports.

18 Claims, 10 Drawing Sheets

(51) Int. Cl.
    *H04L 5/14* (2006.01)
    *H04W 72/1273* (2023.01)
(52) U.S. Cl.
    CPC .......... *H04L 5/0082* (2013.01); *H04L 5/0091*
        (2013.01); *H04L 5/001* (2013.01); *H04L*
        *5/0048* (2013.01); *H04L 5/14* (2013.01);
        *H04W 72/1273* (2013.01)
(58) Field of Classification Search
    CPC ..... H04L 5/0091; H04L 5/001; H04L 5/0048;
        H04L 5/14
    See application file for complete search history.

(56) References Cited

U.S. PATENT DOCUMENTS

| | | | |
|---|---|---|---|
| 2012/0140649 | A1 | 6/2012 | Choudhury et al. |
| 2012/0207047 | A1 | 8/2012 | Liao et al. |
| 2013/0077595 | A1 | 3/2013 | Aiba et al. |
| 2013/0114554 | A1 | 5/2013 | Yang et al. |
| 2013/0121270 | A1 | 5/2013 | Chen et al. |
| 2013/0148613 | A1 | 6/2013 | Han et al. |
| 2013/0242902 | A1 | 9/2013 | Liu et al. |
| 2013/0258954 | A1 | 10/2013 | Khoshnevis et al. |
| 2014/0003345 | A1 | 1/2014 | Chu |
| 2014/0010126 | A1* | 1/2014 | Sayana ................ H04J 3/1694 370/336 |
| 2014/0036704 | A1* | 2/2014 | Han .................... H04L 41/0659 370/252 |
| 2015/0003302 | A1 | 1/2015 | Ekpenyong |
| 2015/0036566 | A1 | 2/2015 | Blankenship et al. |
| 2015/0139169 | A1 | 5/2015 | Sun et al. |
| 2015/0207604 | A1* | 7/2015 | Sun ..................... H04B 7/0626 370/329 |
| 2015/0245346 | A1* | 8/2015 | Yokomakura ......... H04W 72/23 370/329 |
| 2016/0142191 | A1 | 5/2016 | Davydov et al. |
| 2016/0183244 | A1 | 6/2016 | Papasakellariou |
| 2016/0338041 | A1* | 11/2016 | Li ...................... H04W 52/143 |
| 2016/0353387 | A1 | 12/2016 | Gao et al. |
| 2017/0041059 | A1 | 2/2017 | Yi et al. |
| 2017/0041923 | A1 | 2/2017 | Park |
| 2018/0091992 | A1 | 3/2018 | Frenne et al. |
| 2018/0234225 | A1 | 8/2018 | Yokomakura et al. |
| 2019/0159219 | A1* | 5/2019 | Hosseini ............... H04W 72/56 |
| 2019/0223036 | A1 | 7/2019 | Lunttila et al. |
| 2022/0039106 | A1* | 2/2022 | Yokomakura ......... H04L 5/0091 |

FOREIGN PATENT DOCUMENTS

| | | |
|---|---|---|
| EP | 2658155 A2 | 10/2013 |
| EP | 2785102 A1 | 10/2014 |
| EP | 2804425 A1 | 11/2014 |
| EP | 2899909 A1 | 7/2015 |
| JP | 2014-209803 A | 11/2014 |
| JP | 2015-035832 A | 2/2015 |
| JP | 5723032 B2 | 5/2015 |
| WO | 2011/010863 A2 | 1/2011 |
| WO | 2012/111992 A1 | 8/2012 |
| WO | 2014/022032 A1 | 2/2014 |

OTHER PUBLICATIONS

3GPP TS 36.212 V12.3.0 (Dec. 2014)Evolved Universal Terrestrial Radio Access (E-UTRA); Multiplexing and channel coding (Release 12) Valbonne—France.
3GPP TS 36.213 V12.4.0 (Dec. 2014)Evolved Universal Terrestrial Radio Access (E-UTRA); Physical layer procedures (Release 12) Valbonne—France.
3GPP TS 36.321 V12.4.0 (Dec. 2014)Evolved Universal Terrestrial Radio Access (E-UTRA); Medium Access Control (MAC) protocol specification (Release 12) Valbonne—France.
3GPP TS 36.331 V12.4.1 (ec. 2014)Evolved Universal Terrestrial Radio Access (E-UTRA); Radio Resource Control (RRC); Protocol specification (Release 12) Valbonne—France.
Nokia Corporation, NTT DoComo Inc., Nokia Networks, "New WI proposal: LTE Carrier Aggregation Enhancement Beyond 5 Carriers", RP-142286, 3GPP TSG RANMeeting #66, Hawaii, United States of America, Dec. 8-11, 2014.
Non-Final Rejection dated May 2, 2019 for the parent U.S. Appl. No. 15/749,843.
Non-Final Rejection dated Apr. 29, 2020 for the parent U.S. Appl. No. 15/749,843.
Final Rejection dated Sep. 22, 2020 for the parent U.S. Appl. No. 15/749,843.
Advisory Action (PTOL-303) dated Jan. 21, 2021 for the parent U.S. Appl. No. 15/749,843.
Non-Final Rejection dated Mar. 4, 2021 for the parent U.S. Appl. No. 15/749,843.
Notice of Allowance and Fees Due (PTOL-85) dated Oct. 21, 2019 for the parent U.S. Appl. No. 15/749,843.
Notice of Allowance and Fees Due (PTOL-85) dated Jul. 13, 2021 for the parent U.S. Appl. No. 15/749,843.
Notice of Allowance and Fees Due (PTOL-85) dated Sep. 1, 2021 for the parent U.S. Appl. No. 15/749,843.
Samsung, "Discussion on priority rules for CSI feedback for eCA", R1-152854 3GPP TSG RAN WG1 #81, Fukuoka, Japan, May 25-29, 2015.
3GPP TS 36.213 V12.6.0 (Jun. 2015) Brd Generation Partnership Project; Technical Specification Group Radio Access Network; Evolved Universal Terrestrial Radio Access (E-UTRA); Physical layer procedures (Release 12).

\* cited by examiner

TERMINAL DEVICE, BASE STATION DEVICE, COMMUNICATION METHOD, AND INTEGRATED CIRCUIT

TECHNICAL FIELD

Some aspects of the present invention relate to a terminal device, a base station device, a communication method, and an integrated circuit. This application claims priority based on JP 2015-155578 filed on Aug. 6, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been considered (NPL 1, NPL 2, NPL 3, NPL 4, and NPL 5). In LTE, a base station device is also referred to as an evolved Node B (eNodeB), and a terminal device is also referred to as User Equipment (UE) or a mobile station device. LTE is a cellular communication system in which an area is divided into multiple cells to form a cellular pattern, each of the cells being served by a base station device. A single base station device may manage multiple cells.

LTE supports a Time Division Duplex (TDD). LTE that employs a TDD scheme is also referred to as TD-LTE or LTE TDD. In TDD, an uplink signal and a downlink signal are time-division multiplexed. LTE supports a Frequency Division Duplex (FDD).

In 3GPP, Carrier Aggregation (CA) has been specified in which a terminal device can simultaneously perform transmission and/or reception on up to five serving cells (Component Carriers (CCs)).

In 3GPP, a configuration where a terminal device simultaneously performs transmission and/or reception on more than five serving cells (component carriers) has been considered. Furthermore, a configuration where a terminal device performs transmission of a Physical Uplink Control CHannel (PUCCH) on a secondary cell that is a serving cell other than a primary cell has been considered (NPL 6).

Moreover, in 3GPP, a configuration where Channel State Information (CSI) of multiple serving cells is simultaneously transmitted using a new PUCCH format and/or a Physical Uplink Shared CHannel (PUSCH) has been considered.

CITATION LIST

NPL 1: "3GPP TS 36.211 V12.4.0 (2014-12) Evolved Universal Terrestrial Radio Access (E-UTRA); Physical channels and modulation (Release 12)", 6 Jan. 2015.

NPL 2: "3GPP TS 36.212 V12.3.0 (2014-12) Evolved Universal Terrestrial Radio Access (E-UTRA); Multiplexing and channel coding (Release 12)", 6 Jan. 2015.

NPL 3: "3GPP TS 36.213 V12.4.0 (2014-12) Evolved Universal Terrestrial Radio Access (E-UTRA); Physical layer procedures (Release 12)", 7 Jan. 2015.

NPL 4: "3GPP TS 36.321 V12.4.0 (2014-12) Evolved Universal Terrestrial Radio Access (E-UTRA); Medium Access Control (MAC) protocol specification (Release 12)", 5 Jan. 2015.

NPL 5: "3GPP TS 36.331 V12.4.1 (2014-12) Evolved Universal Terrestrial Radio Access (E-UTRA); Radio Resource Control (RRC); Protocol specification (Release 12)", 7 Jan. 2015.

NPL 6: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

An object of some aspects of the present invention is to provide a terminal device, a base station device, a communication method, and an integrated circuit, where the base station device and the terminal device can efficiently communicate in the above-mentioned radio communication systems.

Means for Solving the Problems (1) In order to accomplish the object described above, some aspects of the present invention are contrived to provide the following measures. A terminal device according to an aspect of the present invention may include: a reception unit configured to receive first information, from a base station device, for one or multiple first channel state information reports on a physical uplink channel in a first serving cell, and receive second information, from the base station device, for multiple second channel state information reports on a physical uplink channel in a second serving cell; and a transmission unit configured to perform the above one or multiple pieces of first channel state information reporting and perform the above multiple pieces of second channel state information reporting. In a case that the total number of the one or multiple first channel state information reports and the multiple second channel state information reports in a first subframe exceeds a first certain number, of the one or multiple first channel state information reports and the multiple second channel state information reports, a second certain number of channel state information reports are not updated where the second certain number may be a number obtained by subtracting the first certain number from the total of the number of the one or multiple first channel state information reports and the number of the multiple second channel state information reports.

(2) A terminal device according to an aspect of the present invention may include: a reception unit configured to receive first information, from a base station device, for transmission of one or multiple pieces of first channel state information corresponding to one or multiple first channel state information processes on a physical uplink channel in a first serving cell, and receive second information, from the base station device, for transmission of multiple pieces of second channel state information corresponding to multiple second channel state information processes on a physical uplink channel in a second serving cell; and a transmission unit configured to transmit the above one or multiple pieces of first channel state information and transmit the above multiple pieces of second channel state information. In a case that the total number of the one or multiple first channel state information processes and the multiple second channel state information processes exceeds a first certain number in a first subframe where the transmission of the one or multiple pieces of first channel state information collides with the transmission of the multiple pieces of second channel state information, of the one or multiple first channel state information processes and the multiple second channel state information processes, channel state information corresponding to a second certain number of channel state information processes is not updated where the second certain number may be a number obtained by subtracting the first certain number from the total of the number of the one or multiple first channel state information processes and the number of the multiple second channel state information processes.

(3) A communication method according to an aspect of the present invention may be a communication method for a terminal device, the method including the steps of: receiving first information, from a base station device, for one or multiple first channel state information reports on a physical uplink channel in a first serving cell; receiving second information, from the base station device, for multiple second channel state information reports on a physical uplink channel in a second serving cell; performing the above one or multiple pieces of first channel state information reporting; and performing the above multiple pieces of second channel state information reporting. In a case that the total number of the one or multiple first channel state information reports and the multiple second channel state information reports in a first subframe exceeds a first certain number, of the one or multiple first channel state information reports and the multiple second channel state information reports, a second certain number of channel state information reports are not updated where the second certain number may be a number obtained by subtracting the first certain number from the total of the number of the one or multiple first channel state information reports and the number of the multiple second channel state information reports.

(4) A communication method according to an aspect of the present invention may be a communication method for a terminal device, the method including the steps of: receiving first information, from a base station device, for transmission of one or multiple pieces of first channel state information corresponding to one or multiple first channel state information processes on a physical uplink channel in a first serving cell; receiving second information, from the base station device, for transmission of multiple pieces of second channel state information corresponding to multiple second channel state information processes on a physical uplink channel in a second serving cell; transmitting the above one or multiple pieces of first channel state information; and transmitting the above multiple pieces of second channel state information. In a case that the total number of the one or multiple first channel state information processes and the multiple second channel state information processes exceeds a first certain number in a first subframe where the transmission of the one or multiple pieces of first channel state information collides with the transmission of the multiple pieces of second channel state information, of the one or multiple first channel state information processes and the multiple second channel state information processes, channel state information corresponding to a second certain number of channel state information processes is not updated where the second certain number may be a number obtained by subtracting the first certain number from the total of the number of the one or multiple first channel state information processes and the number of the multiple second channel state information processes.

(5) An integrated circuit according to an aspect of the present invention may be mounted on a terminal device and may include: a reception method configured to receive first information, from a base station device, for one or multiple first channel state information reports on a physical uplink channel in a first serving cell, and receive second information, from the base station device, for multiple second channel state information reports on a physical uplink channel in a second serving cell; and a transmission method configured to perform the above one or multiple pieces of first channel state information reporting and perform the above multiple pieces of second channel state information reporting. In a case that the total number of the one or multiple first channel state information reports and the multiple second channel state information reports in a first subframe exceeds a first certain number, of the one or multiple first channel state information reports and the multiple second channel state information reports, a second certain number of channel state information reports are not updated where the second certain number may be a number obtained by subtracting the first certain number from the total of the number of the one or multiple first channel state information reports and the number of the multiple second channel state information reports.

(6) An integrated circuit according to an aspect of the present invention may be mounted on a terminal device and may include: a reception method configured to receive first information, from a base station device, for transmission of one or multiple pieces of first channel state information corresponding to one or multiple first channel state information processes on a physical uplink channel in a first serving cell, and receive second information, from the base station device, for transmission of multiple pieces of second channel state information corresponding to multiple second channel state information processes on a physical uplink channel in a second serving cell; and a transmission method configured to transmit the above one or multiple pieces of first channel state information and transmit the above multiple pieces of second channel state information. In a case that the total number of the one or multiple first channel state information processes and the multiple second channel state information processes exceeds a first certain number in a first subframe where the transmission of the one or multiple pieces of first channel state information collides with the transmission of the multiple pieces of second channel state information, of the one or multiple first channel state information processes and the multiple second channel state information processes, channel state information corresponding to a second certain number of channel state information processes is not updated where the second certain number may be a number obtained by subtracting the first certain number from the total of the number of the one or multiple first channel state information processes and the number of the multiple second channel state information processes.

Effects of the Invention

According to some aspects of the present invention, a base station device and a terminal device efficiently communicate with each other.

MODE FOR CARRYING OUT THE INVENTION

Embodiments of the present invention will be described below.

Figure 1:
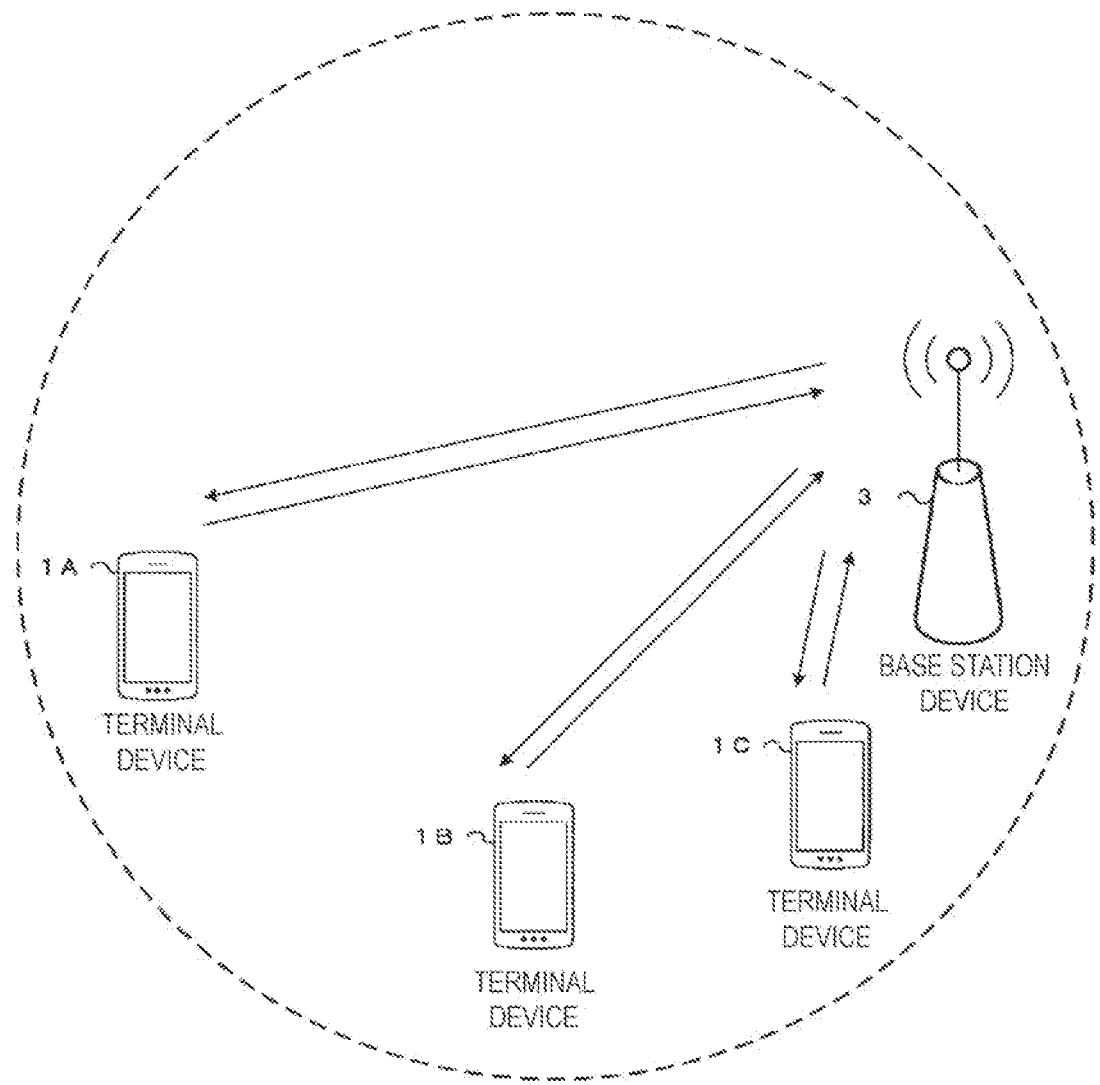
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each referred to as a terminal device 1.

Physical channels and physical signals according to the present embodiment will be described.

In FIG. 1, uplink radio communication from the terminal device 1 to the base station device 3 uses the following uplink physical channels. Here, the uplink physical channels are used to transmit information output from higher layers.

Physical Uplink Control CHannel (PUCCH)
Physical Uplink Shared CHannel (PUSCH)
Physical Random Access CHannel (PRACH)

PUCCH is used to transmit Uplink Control Information (UCI). Here, the Uplink Control Information may include Channel State Information (CSI) used to indicate a downlink channel state. The Uplink Control Information may include Scheduling Request (SR) used to request an UL-SCH resource. The Uplink Control Information may include a Hybrid Automatic Repeat reQuest ACKnowledgement (HARQ-ACK). HARQ-ACK may indicate HARQ-ACK for downlink data (Transport block, Medium Access Control Protocol Data Unit (MAC PDU), DownLink-Shared CHannel (DL-SCH), or Physical Downlink Shared CHannel (PDSCH)).

In other words, HARQ-ACK may indicate ACKnowledgement (ACK) or Negative-ACKnowledgement (NACK). Here, HARQ-ACK may also be referred to as ACK/NACK, HARQ feedback, HARQ acknowledgement, HARQ information, or HARQ control information.

Note that the Channel State Information (CSI) is configured of a Channel Quality Indicator (CQI), a Precoding Matrix Indicator (PMI), a Precoding Type Indicator (PTI), and/or a Rank Indicator (RI).

The Channel State Information may be periodically reported at a certain period or aperiodically reported to the base station device 3 from the terminal device 1. CSI reported is referred to as a CSI report; CSI periodically reported is referred to as periodic channel state information (periodic CSI) or a periodic CSI report, and CSI aperiodically reported is referred to as aperiodic channel state information (aperiodic CSI) or an aperiodic CSI report.

PUSCH is used to transmit uplink data (UpLink-Shared CHannel (UL-SCH)). Furthermore, PUSCH may be used to transmit HARQ-ACK and/or CSI along with the uplink data. Furthermore, PUSCH may be used to transmit CSI only or HARQ-ACK and CSI only. In other words, PUSCH may be used to transmit the Uplink Control Information only.

Here, the base station device 3 and the terminal device 1 communicate a signal in (transmit and/or receive a signal to and from) the higher layer. For example, the base station device 3 and the terminal device 1 may transmit and/or receive Radio Resource Control (RRC) signaling (also referred to as a RRC message, RRC information) in a RRC layer. The base station device 3 and the terminal device 1 may transmit and/or receive a Medium Access Control (MAC) control element in a MAC layer. Here, the RRC signaling and/or MAC control element is also referred to as higher layer signaling.

PUSCH may be used to transmit the RRC signaling and the MAC control element. Here, the RRC signaling transmitted from the base station device 3 may be signaling common to the multiple terminal devices 1 in a cell. The RRC signaling transmitted from the base station device 3 may be signaling dedicated to a certain terminal device 1 (also referred to as dedicated signaling). In other words, terminal device-specific (UE-specific) information may be transmitted through signaling dedicated to the certain terminal device 1.

PRACH is used to transmit a random access preamble. PRACH may be used for an initial connection establishment procedure, a handover procedure, a connection re-establishment procedure, uplink transmission synchronization (Timing Adjustment), and indicating a PUSCH resource request.

In FIG. 1, the following uplink physical signal is used in the uplink radio communication. Here, the uplink physical signal is not used to transmit information output from higher layers but is used by a physical layer.

UpLink Reference Signal (UL RS)

According to the present embodiment, the following two types of uplink reference signals are used.

Demodulation Reference Signal (DMRS)
Sounding Reference Signal (SRS)

DMRS is associated with transmission of PUSCH or PUCCH. DMRS is time-multiplexed with PUSCH or PUCCH. The base station device 3 uses DMRS in order to perform channel compensation of PUSCH or PUCCH. Transmission of both PUSCH and DMRS is hereinafter referred to simply as transmission of PUSCH. Transmission of both PUCCH and DMRS is hereinafter referred to simply as transmission of PUCCH.

SRS has no association with the transmission of PUSCH or PUCCH. The base station device 3 uses SRS in order to measure an uplink channel state.

In FIG. 1, the following downlink physical channels are used for downlink radio communication from the base station device 3 to the terminal device 1. Here, the downlink physical channel is used to transmit the information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)

Enhanced Physical Downlink Control CHannel (EPDCCH)

Physical Downlink Shared CHannel (PDSCH)

Physical Multicast CHannel (PMCH)

PBCH is used to broadcast a Master Information Block (MIB), or a Broadcast CHannel (BCH), that is shared by the terminal devices 1.

PCFICH is used to transmit information indicating a region (OFDM symbols) to be used for transmission of PDCCH.

PHICH is used to transmit an HARQ indicator (HARQ feedback or response information) indicating an ACKnowledgement (ACK) or a Negative ACKnowledgement (NACK) with respect to the uplink data (UpLink Shared CHannel (UL-SCH)) received by the base station device 3.

PDCCH and EPDCCH are used to transmit Downlink Control Information (DCI). Here, multiple DCI formats are defined for transmission of the Downlink Control Information. In other words, a field for the Downlink Control Information is defined in a DCI format and is mapped to information bits.

For example, DCI formats for downlink (for example, DCI format 1A and DCI format 1C) to be used for the scheduling of one PDSCH in one cell (transmission of a single downlink transport block) may be defined.

Here, each of the downlink DCI formats includes information about the scheduling of PDSCH. For example, the downlink DCI format includes the Downlink Control Information such as a Carrier Indicator Field (CIF), information about resource block assignment, information about a Modulation and Coding Scheme (MCS), or information used for indicating the number of transmission layers in PDSCH transmission (precoding information). Here, the downlink DCI format is also referred to as downlink grant or downlink assignment.

Furthermore, for example, DCI formats for uplink (for example, DCI format 0 and DCI format 4) to be used for the scheduling of one PUSCH in one cell (transmission of a single uplink transport block) are defined.

Here, each of the uplink DCI formats includes information about the scheduling of PUSCH. For example, the uplink DCI format includes the Downlink Control Information such as a Carrier Indicator Field (CIF), information about Resource block assignment and/or hopping resource allocation, information about Modulation and Coding Scheme (MCS) and/or redundancy version, or information used for indicating the number of transmission layers in PUSCH transmission (Precoding information and the number of layers). Here, the uplink DCI format is also referred to as uplink grant or uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or Uplink Control Information about the scheduled PUSCH.

In the present embodiment, PDCCH and EPDCCH are collectively referred to simply as PDCCH. In the present embodiment, a PDCCH candidate and an EPDCCH candidate are collectively referred to simply as a PDCCH candidate as well.

Here, RNTI assigned to the terminal device 1 by the base station device 3 is used for the transmission of Downlink Control Information (transmission on the PDCCH). Specifically, Cyclic Redundancy check (CRC) parity bits are attached to a DCI format (or Downlink Control Information (DCI)), and after the attachment, CRC parity bits are scrambled with RNTI. Here, the CRC parity bits attached to the DCI format may be obtained from the payload of the corresponding DCI format.

The terminal device 1 attempts to decode the DCI format to which the CRC parity bits scrambled with RNTI have been attached, and detects, as a DCI format destined for the terminal device 1 itself, the DCI format for which CRC has been successful (also referred to as blind coding). In other words, the terminal device 1 may detect PDCCH with CRC scrambled with RNTI. The terminal device 1 may detect PDCCH including the DCI format to which the CRC parity bits scrambled with RNTI have been attached.

Here, RNTI may include a Cell-Radio Network Temporary Identifier (C-RNTI). C-RNTI is an identifier unique to the terminal device 1 and used for the identification in an RRC connection and scheduling. C-RNTI may be used for dynamically scheduled unicast transmission.

RNTI may further include a Semi-Persistent Scheduling C-RNTI (SPS C-RNTI). SPS C-RNTI is an identifier unique to the terminal device 1 and used for semi-persistent scheduling. SPS C-RNTI may be used for semi-persistently scheduled unicast transmission.

RNTI may include a Temporary C-RNTI. Here, the Temporary C-RNTI is an identifier unique to the preamble transmitted by the terminal device 1 and used during a contention base random access procedure. The temporary C-RNTI may be used for dynamically scheduled transmission.

PDSCH is used to transmit downlink data (DownLink Shared CHannel (DL-SCH)). PDSCH is used to transmit a system information message. Here, the system information message may be cell-specific information (information unique to a cell). The system information is included in RRC signaling. PDSCH is used to transmit the RRC signaling and the MAC control element.

PMCH is used to transmit multicast data (Multicast CHannel (MCH)).

In FIG. 1, the following downlink physical signals are used in the downlink radio communication. Here, the downlink physical signals are not used to transmit the information output from the higher layers but is used by the physical layer.

Synchronization signal (SS)

DownLink Reference Signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to the subframes 0 and 5 within the radio frame.

The downlink reference signal is used in order for the terminal device 1 to perform the channel compensation of the downlink physical channel. The downlink reference signal is used in order for the terminal device 1 to obtain the downlink CSI.

According to the present embodiment, the following five types of downlink reference signals are used.

Cell-specific Reference Signal (CRS)

UE-specific Reference Signal (URS) associated with PDSCH

Demodulation Reference Signal (DMRS) associated with EPDCCH

Non-Zero Power Chanel State Information-Reference Signal (NZP CSI-RS)

Zero Power Chanel State Information-Reference Signal (ZP CSI-RS)

Multimedia Broadcast and Multicast Service over Single Frequency Network Reference signal (MBSFN RS)

Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signals and the uplink physical signals are collectively referred to as a physical signal.

BCH, MCH, UL-SCH, and DL-SCH are transport channels. A channel used in the Medium Access Control (MAC) layer is referred to as a transport channel. The unit of the transport channel used in the MAC layer is referred to as a Transport Block (TB) or a MAC Protocol Data Unit (PDU). Control of a Hybrid Automatic Repeat reQuest (HARD) is performed for each transport block in the MAC layer. The transport block is a unit of data that the MAC layer delivers to the physical layer. In the physical layer, the transport block is mapped to a codeword, and coding processing is performed on a codeword-by-codeword basis.

The terminal device 1 switches and uses available multiple transmission modes of different transmission systems such as single antenna transmission, transmission diversity, Multiple Input Multiple Output (MIMO), or the like. For example, a transmission mode specified by the base station among transmission modes 1 to 10 is used as the transmission mode in operation. For example, the transmission mode 10 is a transmission mode capable of configuring multiple CSI processes.

The carrier aggregation will be described below.

In the present embodiment, one or multiple serving cells may be configured for the terminal device 1. A technology in which the terminal device 1 communicates via multiple serving cells is referred to as carrier aggregation or cell aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups (for example, PUCCH cell groups) configured for the terminal device 1, which will be described later. Alternatively, the present embodiment may apply to one or some of the multiple serving cell groups configured for the terminal device 1.

In the present embodiment, Time Division Duplex (TDD) and/or Frequency Division Duplex (FDD) may be applied. Here, for carrier aggregation, TDD or FDD may apply to one or all of the multiple serving cells. Alternatively, for carrier aggregation serving cells to which TDD applies and serving cells to which FDD applies may be aggregated. Here, a frame structure for FDD is also referred to as Frame structure type 1. A frame structure for TDD is referred to as Frame structure type 2.

Here, the configured one or multiple serving cells include one primary cell and one or multiple secondary cells. The primary cell may be a serving cell on which an initial connection establishment procedure has been performed, a serving cell in which a connection re-establishment procedure has been started, or a cell indicated as a primary cell during a handover procedure. At a point of time when an RRC connection is established, or later, a secondary cell may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the primary cell is used to transmit PUCCH. Note that the primary cell is not deactivated. Cross carrier scheduling is not applied to the primary. In other words, the primary cell is always scheduled via PDCCH in the primary cell.

In a case that PDCCH (PDCCH monitoring) is configured in a certain secondary cell, cross carrier scheduling may not be applied to the certain secondary cell. In other words, in this case, the secondary cell may be always scheduled via its PDCCH. In a case that no PDCCH (PDCCH monitoring) of a secondary cell is configured, cross carrier scheduling applies to the secondary cell, and the secondary cell may always be scheduled via PDCCH in one other serving cell.

Here, in the present embodiment, a secondary cell used to transmit PUCCH is referred to as a PUCCH secondary cell or a special secondary cell. A secondary cell not used to transmit PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell and PUCCH cell.

Here, the PUCCH serving cell (primary cell, PUCCH secondary cell) always has the downlink component carrier and the uplink component carrier. A PUCCH resource is configured in the PUCCH serving cell (primary cell, PUCCH secondary cell).

The non-PUCCH serving cell (non-PUCCH secondary cell) may have only the downlink component carrier. The non-PUCCH serving cell (non-PUCCH secondary cell) may have the downlink component carrier and the uplink component carrier.

The terminal device 1 may perform PUCCH transmission on the PUCCH serving cell. In other words, the terminal device 1 may perform PUCCH transmission on the primary cell. Moreover, the terminal device 1 may perform PUCCH transmission on the PUCCH secondary cell. That is, the terminal device 1 does not perform PUCCH transmission on the non-special secondary cell.

Here, the PUCCH secondary cell may be defined as a serving cell that is neither a primary cell nor a secondary cell.

In other words, the PUCCH secondary cell may be used to transmit PUCCH. Here, the PUCCH secondary cell may not be deactivated. Further, the PUCCH secondary cell may be activated and/or deactivated as described later.

Cross carrier scheduling may not be applied to the PUCCH secondary cell. In other words, the PUCCH secondary cell may be always scheduled via its PDCCH. Here, cross carrier scheduling may be applied to the PUCCH secondary cell. In other words, the PUCCH secondary cell may be scheduled via PDCCH of one other serving cell.

For example, in a case that PDCCH (PDCCH monitoring) is configured in the PUCCH secondary cell, cross carrier scheduling may not be applied to the stated PUCCH secondary cell. In other words, in this case, the PUCCH secondary cell may be always scheduled via its PDCCH. In a case that no PDCCH (PDCCH monitoring) of the PUCCH secondary cell is configured, cross carrier scheduling applies to the PUCCH secondary cell, and the PUCCH secondary cell may always be scheduled via PDCCH in another serving cell.

Here, linking may be defined between the uplink (e.g., uplink component carrier) and the downlink (e.g., the downlink component carrier). In other words, in accordance with the linking between the uplink and the downlink, the serving cell for downlink assignment (serving cell on which PDSCH transmission scheduled via downlink assignment (downlink transmission) is performed) may be identified. In accordance with the linking between the uplink and the downlink, the serving cell for uplink grant (serving cell on which PUSCH transmission scheduled via uplink grant (uplink transmission) is performed) may be identified. Here, there is no Carrier Indicator Field in the downlink assignment or the uplink.

In other words, the downlink assignment received in the primary cell may correspond to downlink transmission in the primary cell. Moreover, the uplink grant received in the primary cell may correspond to uplink transmission in the primary cell. The downlink assignment received in the PUCCH secondary cell may correspond to downlink transmission in the PUCCH secondary cell. Moreover, the uplink grant received in the PUCCH secondary cell may correspond to uplink transmission in the PUCCH secondary cell.

The downlink assignment received on a certain secondary cell (PUCCH secondary cell and/or non-PUCCH secondary cell) may correspond to the downlink transmission on this secondary cell. The uplink grant received on a certain secondary cell (PUCCH secondary cell and/or non-PUCCH secondary cell) may correspond to the uplink transmission on the certain secondary cell.

Here, the base station device 3 may configure one or multiple serving cells through higher layer signaling. For example, one or multiple secondary cells may be configured to form a set of multiple serving cells with a primary cell. Here, the serving cells configured by the base station device 3 may include a PUCCH secondary cell.

In other words, the PUCCH secondary cell may be configured by the base station device 3. For example, the base station device 3 may transmit the higher layer signaling that includes information (index) used to configure the PUCCH secondary cell.

The base station device 3 may activate or deactivate one or multiple serving cells through higher layer signaling (for example, a MAC control element). For example, the activation or deactivation mechanism may be based on a combination of the MAC control element and a deactivation timer.

Here, secondary cells activated or deactivated by the base station device 3 may include a PUCCH secondary cell. To be more specific, the base station device 3 may solely activate or deactivate multiple secondary cells including the PUCCH secondary cell through a single activation/deactivation command. In other words, the base station device 3 may transmit the single activation/deactivation command to be used to activate or deactivate secondary cells through the MAC control element.

As a value of the deactivation timer, a common value may be configured for each terminal device 1 by higher layers (for example, the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit higher layer signaling including the deactivation timer for the PUCCH secondary cells and information about the configuration of the deactivation timer. Moreover, the base station device 3 may transmit higher layer signaling including the deactivation timer for the non-PUCCH secondary cells and information about the configuration of the deactivation timer.

A configuration of a slot according to the present embodiment will be described below.

Figure 2:
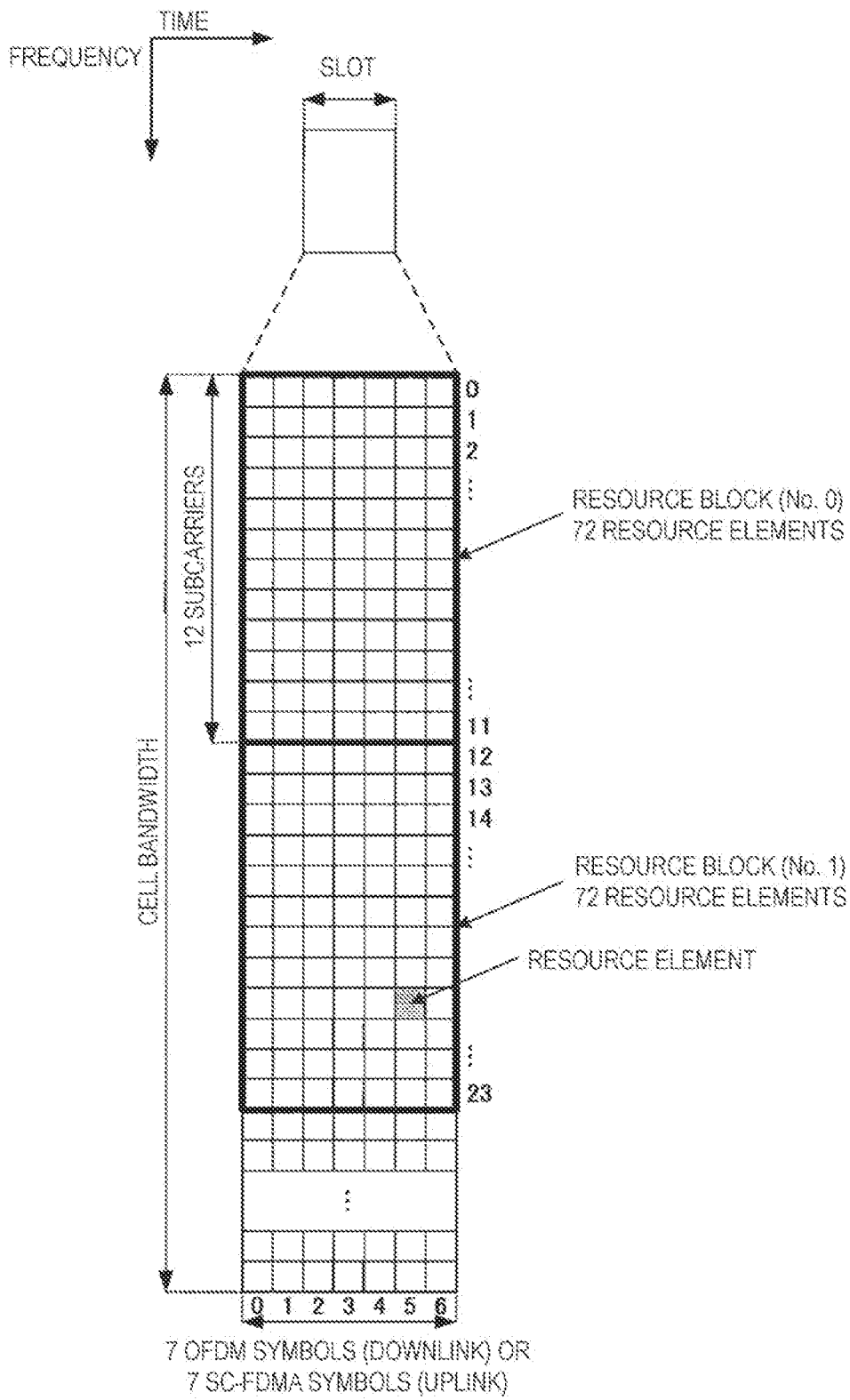
FIG. 2 is a diagram illustrating a configuration of a slot according to the present embodiment.

FIG. 2 is a diagram illustrating the configuration of the slot according to the present embodiment. In FIG. 2, the horizontal axis represents a time axis, and the vertical axis represents a frequency axis. Here, a normal Cyclic Prefix (CP) may apply to an OFDM symbol. Alternatively, an extended Cyclic Prefix (CP) may apply to the OFDM symbol. The physical signal or the physical channel transmitted in each of the slots is expressed by a resource grid.

In downlink, the resource grid may be defined by multiple subcarriers and multiple OFDM symbols. In uplink, the resource grid may be defined by multiple subcarriers and multiple SC-FDMA symbols. The number of subcarriers constituting one slot may depend on a cell bandwidth. The number of OFDM symbols or SC-FDMA symbols constituting one slot may be seven. Each element within the resource grid is referred to as a resource element. The resource element may be identified by a subcarrier number, and an OFDM symbol or SC-FDMA symbol number.

A resource block may be used to express mapping of a certain physical channel (PDSCH, PUSCH, or the like) to the resource elements. The resource block may be defined by a virtual resource block and a physical resource block. A certain physical channel may be first mapped to the virtual resource block. Thereafter, the virtual resource block may be mapped to the physical resource block. One physical resource block may be defined by seven consecutive OFDM symbols or SC-FDMA symbols in a time domain and by 12 consecutive subcarriers in a frequency domain. Therefore, one physical resource block may include (7×12) resource elements. Furthermore, one physical resource block may correspond to one slot in the time domain and correspond to 180 kHz in the frequency domain. The physical resource blocks may be numbered from 0 in the frequency domain.

Figure 3A:
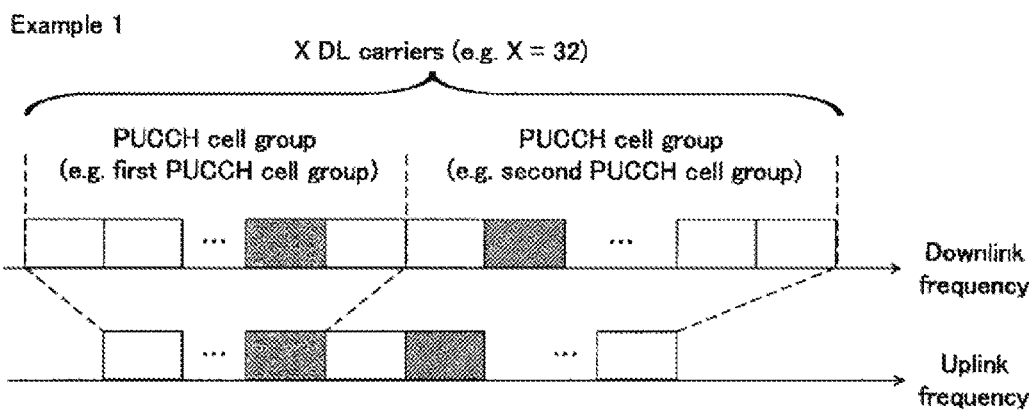
FIG. 3A is a first diagram illustrating PUCCH cell groups according to the present embodiment.
Figure 3B:
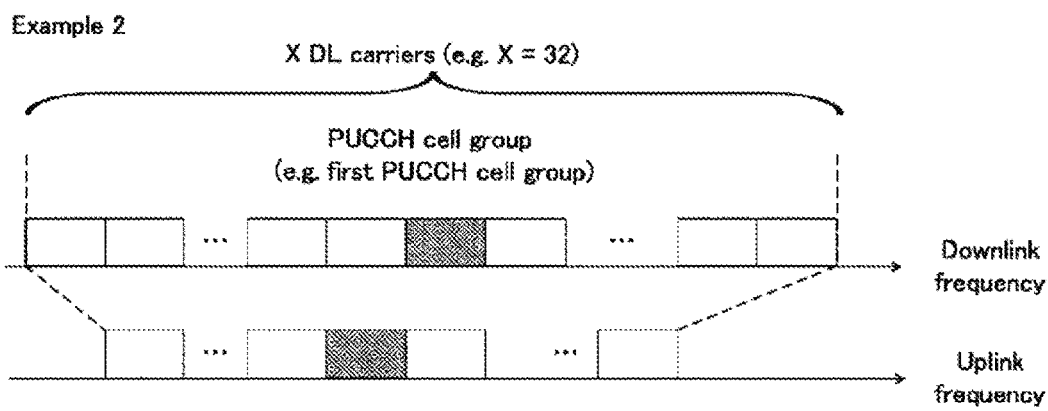
FIG. 3B is a second diagram illustrating PUCCH cell groups according to the present embodiment.
Figure 3C:
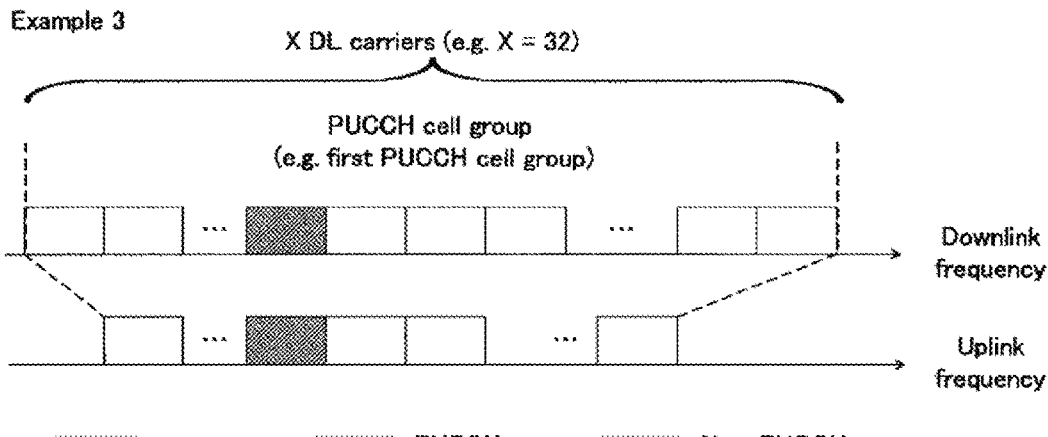
FIG. 3C is a third diagram illustrating PUCCH cell groups according to the present embodiment.

FIGS. 3A to 3C are diagrams illustrating cell groups according to the present embodiment. FIGS. 3A to 3C respectively illustrate three examples (Example (a), Example (b), and Example (c)) as examples of a configuration of a PUCCH cell group (configuration, definition). Here, in the present embodiment, a group of one or multiple serving cells is referred to as a PUCCH cell group. The PUCCH cell group may be a group associated with transmission on PUCCH (transmission of Uplink Control Information of PUCCH). Here, a certain serving cell belongs to any one of PUCCH cell groups. Here, it goes without saying that the PUCCH cell group may be configured differently from the examples illustrated in FIGS. 3A to 3C.

The PUCCH cell group may be configured by the base station device 3. For example, the base station device 3 may transmit the higher layer signaling that includes information (index, cell group index) used to configure the PUCCH cell group.

It is needless to say that the present embodiment can be applied to a group of one or multiple serving cells different from the above-discussed PUCCH cell group. For example, the base station device 3 may configure a group of one or multiple serving cells that is made to correspond to the serving cells specified using the Carrier Indicator Field (CIF). In other words, the base station device 3 may configure a group of one or multiple serving cells associated with uplink transmission. In addition, the base station device 3 may configure a group of one or multiple serving cells associated with downlink transmission.

Hereinafter, a group of one or multiple serving cells configured by the base station device 3 is also referred to as a cell group. That is, the PUCCH cell group is included in a cell group. The base station device 3 and/or the terminal device 1 may perform, on each of the cell groups, operations described in the present embodiment. To be specific, the base station device 3 and/or the terminal device 1 may perform the operations described in the present embodiment, in one cell group.

Here, for example, the base station device 3 and/or the terminal device 1 may support carrier aggregation of up to 32 downlink component carriers (downlink cells). In other words, the base station device 3 and/or the terminal device 1 can simultaneously perform transmission and/or reception of multiple physical channels on up to 32 serving cells. Here, the number of uplink component carriers may be less than the number of downlink component carriers.

Further, the base station device 3 and/or the terminal device 1 may support carrier aggregation of up to 5 downlink component carriers (downlink cells), for example. In other words, the base station device 3 and/or the terminal device 1 can simultaneously perform transmission and/or reception of multiple physical channels on up to 5 serving cells. Here, the number of uplink component carriers may be less than the number of downlink component carriers.

FIG. 3A illustrates a configuration where a first cell group and a second cell group are configured as cell groups (the PUCCH cell groups in this case). For example, in FIG. 3A, the base station device 3 may transmit a downlink signal in the first cell group, and the terminal device 3 may transmit an uplink signal in the first cell group (may transmit Uplink Control Information of PUCCH in the first cell group). For example, in a case that 20 serving cells (downlink component carriers or downlink cells) are configured or activated in the first cell group, the base station device 3 and the terminal device 1 may transmit and/or receive Uplink Control Information for the 20 downlink component carriers to and from each other.

To be more specific, the terminal device 1 may transmit HARQ-ACK for the 20 downlink component carriers (HARQ-ACK for transmission on PDSCH and HARQ-ACK for transport blocks). The terminal device 1 may transmit CSI corresponding to each of the 20 downlink component carriers. Moreover, the terminal device 1 may transmit SR for each cell group. Similarly, the base station device 3 and the terminal device 1 may transmit and/or receive Uplink Control Information to and from each other in the second cell group.

Similarly, the base station device 3 and the terminal device 1 may configure a cell group as illustrated in FIG. 3B, and transmit and/or receive Uplink Control Information to and from each other. The base station device 3 and the terminal device 1 may configure a cell group as illustrated in FIG. 3C, and transmit and/or receive Uplink Control Information to and from each other.

Here, one cell group (e.g., PUCCH cell group) may include at least one serving cell (e.g., PUCCH serving cell). Further, one cell group (e.g., PUCCH cell group) may include only one serving cell (e.g., PUCCH serving cell only). In addition, one PUCCH cell group may include one PUCCH serving cell, and one or multiple non-PUCCH serving cells, for example.

Here, the cell group including the primary cell is referred to as a primary cell group. The cell group not including the primary cell is referred to as a secondary cell group. A PUCCH cell group including the primary cell is referred to as a primary PUCCH cell group. The PUCCH cell group not including the primary cell is referred to as a secondary PUCCH cell group.

In other words, the secondary PUCCH cell group may include a PUCCH secondary cell. For example, the index for the primary PUCCH cell group may always be defined as 0. The index for the secondary PUCCH cell group may be configured by the base station device 3 (or a network device).

The base station device 3 may transmit information used to indicate the PUCCH secondary cell with the information included in the higher layer signaling and/or PDCCH (the Downlink Control Information transmitted on PDCCH). The terminal device 1 may determine the PUCCH secondary cell in accordance with the information used to indicate the PUCCH secondary cell. The cell index of the PUCCH secondary cell may be defined in advance by a specification or the like.

As described above, PUCCH in the PUCCH serving cell may be used to transmit the Uplink Control Information (HARQ-ACK, CSI (e.g., periodic CSI) and/or SR) with respect to a serving cell (PUCCH serving cell, non-PUCCH serving cell) included in the PUCCH cell group to which that PUCCH serving cell belongs.

In other words, Uplink Control Information (HARQ-ACK, CSI (for example, periodic CSI), and/or SR) for the serving cells (the PUCCH serving cell and the non-PUCCH serving cell) included in the PUCCH cell group is transmitted on PUCCH in the PUCCH serving cell included in the PUCCH cell group.

Here, the present embodiment may apply only to transmission of HARQ-ACK. Alternatively, the present embodiment may apply only to transmission of CSI (for example, periodic CSI). Alternatively, the present embodiment may apply only to transmission of SR. Alternatively, the present embodiment may apply to transmission of HARQ-ACK, transmission of CSI (for example, periodic CSI), and/or transmission of SR.

In other words, a cell group (or PUCCH cell group) for transmission of HARQ-ACK may be configured. A cell group (or PUCCH cell group) for transmission of CSI (for example, periodic CSI) may be configured. A cell group (or PUCCH cell group) for transmission of SR may be configured.

For example, a cell group for transmission of HARQ-ACK, a cell group for transmission of CSI (for example, periodic CSI), and/or a cell group for transmission of SR may be configured separately. Alternatively, a common cell group may be configured as a cell group for transmission of HARQ-ACK, a cell group for transmission of CSI (for example, periodic CSI), and/or a cell group for transmission of SR.

Here, the number of cell groups for transmission of HARQ-ACK may be one or two. The number of cell groups for transmission of CSI may be one or two. The number of cell groups for transmission of SR may be one or two. A cell group for transmission of CSI (for example, periodic CSI) and/or a cell group for transmission of SR may not be configured (defined).

Here, multiple formats may be defined (supported) for PUCCH. Each format supported for PUCCH (the format that PUCCH supports) is also referred to as a PUCCH format. For example, the use of the following PUCCH formats allows combinations of pieces of Uplink Control Information of PUCCH (transmission of combinations of pieces of Uplink Control Information) to be supported.

Format 1
Format 1a
Format 1b
Format 2
Format 2a
Format 2b
Format 3
Format 4
(Format 4a)
(Format 4b)

PUCCH format 1 may be defined for positive SR. For example, the positive SR may be used to indicate that an UL-SCH resource is requested. Here, negative SR may be used to indicate that an UL-SCH resource is not requested. PUCCH format 1 is also referred to as a first PUCCH format below.

PUCCH format 1a may be defined for 1-bit HARQ-ACK or 1-bit HARQ-ACK with positive SR. PUCCH format 1b may be defined for 2-bit HARQ-ACK or 2-bit HARQ-ACK with positive SR. PUCCH format 1b may be defined for transmission of up to 4-bit HARQ-ACK with channel selection. PUCCH format 1a and/or PUCCH format 1b is also referred to as a second PUCCH format below.

PUCCH format 2 may be defined for a CSI report when not multiplexed with HARQ-ACK. PUCCH format 2a may be defined for a CSI report multiplexed with 1-bit HARQ-ACK. PUCCH format 2b may be defined for a CSI report multiplexed with 2-bit HARQ-ACK. Here, PUCCH format 2 may be defined for a CSI report multiplexed with HARQ-ACK for extended cyclic prefix. PUCCH format 2, PUCCH format 2a, and/or PUCCH format 2b is also referred to as a third PUCCH format below.

PUCCH format 3 may be defined for up to 10-bit HARQ-ACK. For example, PUCCH format 3 may be defined for up to 10-bit HARQ-ACK with respect to FDD or FDD-TDD primary cell Frame structure type 1.

PUCCH format 3 may be defined for up to 20-bit HARQ-ACK. Alternatively, PUCCH format 3 may be defined for up to 20-bit HARQ-ACK with respect to TDD. PUCCH format 3 may be defined for up to 21-bit HARQ-ACK. For example, PUCCH format 3 may be defined for up to 21-bit HARQ-ACK with respect to FDD-TDD primary cell Frame structure type 2.

Alternatively, PUCCH format 3 may be defined for up to 11-bit corresponding to up to 10-bit HARQ-ACK and 1-bit positive/negative SR. For example, PUCCH format 3 may be defined for up to 11-bit corresponding to 10-bit HARQ-ACK and 1-bit positive/negative SR with respect to FDD or FDD-TDD.

Alternatively, PUCCH format 3 may be defined for up to 21-bit corresponding to up to 20-bit HARQ-ACK and 1-bit positive/negative SR. For example, PUCCH format 3 may be defined for up to 21-bit corresponding to 20-bit HARQ-ACK and 1-bit positive/negative SR with respect to TDD. Alternatively, PUCCH format 3 may be defined for up to 22-bit corresponding to up to 21-bit HARQ-ACK and 1-bit positive/negative SR. For example, PUCCH format 3 may be defined for up to 22-bit corresponding to 21-bit HARQ-ACK and 1-bit positive/negative SR with respect to FDD-TDD primary cell Frame structure type 2.

Here, in a case where Uplink Control Information (HARQ-ACK, SR, and/or CSI) is transmitted using PUCCH format 3, a first coding method (e.g., Reed Muller code (Reed Muller coding) or (32, 0) block code ((32, 0) block coding)) may be used. For example, basic sequences for (32, 0) block code may be given in advance by a specification or the like.

PUCCH format 3 may be defined for HARQ-ACK and a CSI report for one serving cell. Alternatively, PUCCH format 3 may be defined for HARQ-ACK and one CSI report for one serving cell. Alternatively, PUCCH format 3 may be defined for multiple CSI reports. Alternatively, PUCCH format 3 may be defined for HARQ-ACK and multiple CSI reports. Alternatively, PUCCH format 3 may be defined for HARQ-ACK, 1-bit positive/negative SR (if any), and a CSI report for one serving cell. Alternatively, PUCCH format 3 may be defined for HARQ-ACK, 1-bit positive/negative SR, and one CSI report. Alternatively, PUCCH format 3 may be defined for HARQ-ACK, 1-bit positive/negative SR, and multiple CSI reports. PUCCH format 3 is also referred to as a fourth PUCCH format below.

PUCCH format 4 may be defined for HARQ-ACK corresponding to up to 32 serving cells in number (downlink component carriers or downlink cells). Alternatively, PUCCH format 4 may be defined for HARQ-ACK and one or multiple CSI reports. Alternatively, PUCCH format 4 may be defined for HARQ-ACK and SR. Alternatively, PUCCH format 4 may be defined for HARQ-ACK, SR, and one or multiple CSI reports. Here, the above one or multiple CSI reports may be a CSI report for one serving cell. Alternatively, the one or multiple CSI reports may be multiple CSI reports for multiple serving cells. Alternatively, the one or multiple CSI reports may include one CSI report for one CSI process with respect to one serving cell. In addition, the one or multiple CSI reports may be one CSI report for one CSI process. Alternatively, the one or multiple CSI reports may be multiple CSI reports for multiple CSI processes. Alternatively, the one or multiple CSI reports may include one CSI report for one subframe set with respect to one serving cell. Alternatively, the one or multiple CSI reports may be multiple CSI reports for multiple subframe sets. SR may be positive SR and/or negative SR. Note that, however, not PUCCH format 4 common to the following cases but a PUCCH format different in any one of the cases may be used: a case of being used for HARQ-ACK, a case of being used for one or multiple CSI reports with respect to multiple serving cells or multiple CSI processes, and a case of being used for transmitting HARQ-ACK and one or multiple CSI reports at the same time. (Such PUCCH format may be defined as PUCCH format 4, PUCCH format 4a, and PUCCH format 4b respectively, for example). Hereinafter, PUCCH format 4 (in which PUCCH format 4a and PUCCH format 4b may be included) is also referred to as a fifth PUCCH format.

Here, in a case where Uplink Control Information is transmitted using the fifth PUCCH format, a second coding method (e.g., Tail biting convolutional encoder (Tail biting convolutional coding) or Turbo encoder (Turbo coding)) may be used.

In other words, the number of bits per subframe transmitted (capable of being transmitted) using the fifth PUCCH format may be greater than the number of bits per subframe (capable of being transmitted) using the fourth PUCCH format. In other words, the amount of information per subframe transmitted (capable of being transmitted) using the fifth PUCCH format may be greater than the amount of information per subframe (capable of being transmitted) using the fourth PUCCH format. Further, as discussed above, different coding methods may be used for the transmission of Uplink Control Information using the fourth PUCCH format and the transmission of Uplink Control Information using the fifth PUCCH format.

Here, in a case where HARQ-ACK is transmitted using the third PUCCH format, the terminal device 1 may determine the number of HARQ-ACK bits at least based on the number of configured serving cells and the downlink transmission mode configured for the serving cells (each of the configured serving cells). In a case where HARQ-ACK is transmitted using the fifth PUCCH format, the terminal device 1 may determine the number of HARQ-ACK bits at least based on the number of configured or activated serving cells and the downlink transmission mode configured for the serving cells (each of the configured or activated serving cells).

In addition, in a case where HARQ-ACK is transmitted using the fourth PUCCH format, the terminal device 1 may determine the number of HARQ-ACK bits at least based on the number of configured serving cells and the downlink transmission mode configured for the serving cells (each of the configured serving cells). In a case where HARQ-ACK is transmitted using the fifth PUCCH format, the terminal device 1 may determine the number of HARQ-ACK bits at least based on the number of configured or activated serving cells and the downlink transmission mode configured for the serving cells (each of the configured or activated serving cells).

For example, the terminal device 1 may use HARQ-ACK bit including two bits for a serving cell configured to be in a downlink transmission mode that supports up to two transport blocks, and use HARQ-ACK bit including one bit otherwise (for example, for a serving cell configured to be in a downlink transmission mode that supports one transport block). Here, for example, the downlink transmission mode supporting up to two transport blocks may include the transmission mode 3, transmission mode 4, transmission mode 8, transmission mode 9, and/or transmission mode 10. Further, the downlink transmission mode supporting one transport block may include the transmission mode 1, transmission mode 2, transmission mode 5, transmission mode 6, and/or transmission mode 7.

As discussed above, the base station device 3 may configure a serving cell in the terminal device 1 by using higher layer signaling (e.g., RRC signaling). Further, the base station device 3 may configure a downlink transmission mode (e.g., RRC signaling) in the terminal device 1 by using higher layer signaling. For example, the base station device 3 may configure the downlink transmission mode associated with the PDSCH transmission in the terminal device 1. That is, the number of bits of HARQ-ACK may be determined in the RRC layer (based on information in the RRC layer) for HARQ-ACK transmission using the fourth PUCCH format and/or the fifth PUCCH format.

Here, the base station device 3 may make a configuration through higher layer signaling (information transmitted using higher layer signaling) and/or PDCCH (Downlink Control Information transmitted on PDCCH) in order for the terminal device 1 to use any one of PUCCH format 1b with channel selection, PUCCH format 3, and PUCCH format 4 (or PUCCH format 4a and/or PUCCH format 4b as needed) for the transmission of Uplink Control Information (e.g., HARQ-ACK transmission). In other words, the base station device 3 may make a configuration in order for the terminal device 1 to use PUCCH format 1b with channel selection for the transmission of Uplink Control Information. Further, the base station device 3 may make a configuration in order for the terminal device 1 to use PUCCH format 3 for the transmission of Uplink Control Information. Furthermore, the base station device 3 may make a configuration for the terminal device 1 to use PUCCH format 4 (or PUCCH format 4a and/or PUCCH format 4b as needed) for the transmission of Uplink Control Information.

For example, the base station device 3 may make a configuration in order for the terminal device 1 to use any one of PUCCH format 1b with channel selection, PUCCH format 3, and PUCCH format 4 (or PUCCH format 4a and/or PUCCH format 4b as needed) for each cell group. In other words, the base station device 3 may make a configuration in order for the terminal device 1 to use any one of PUCCH format 1b with channel selection, PUCCH format 3, and PUCCH format 4 (or PUCCH format 4a and/or PUCCH format 4b as needed) for each cell group separately. In other words, the terminal device 1 may be so configured, by the base station device 3, as to use any one of PUCCH format 1b with channel selection, PUCCH format 3, and PUCCH format 4 (or PUCCH format 4a and/or PUCCH format 4b as needed).

The terminal device 1 may be so configured, by the base station device 3, as to use any one of PUCCH format 1b with channel selection, PUCCH format 3, and PUCCH format 4 (or PUCCH format 4a and/or PUCCH format 4b as needed) in a case where serving cells more than one (more than one and up to five serving cells) with Frame structure type 1 and/or Frame structure type 2 are configured. The terminal device 1 may be so configured, by the base station device 3, as to use any one of PUCCH format 1b with channel selection, PUCCH format 3, and PUCCH format 4 (or PUCCH format 4a and/or PUCCH format 4b as needed) in a case where more than five serving cells with Frame structure type 1 and/or Frame structure type 2 are configured.

The base station device 3 may indicate (configure or allocate) a PUCCH resource for the terminal device 1. Here, the PUCCH resource may include a first PUCCH resource (also referred to as n(1)PUCCH), a second PUCCH resource (also referred to as n(2)PUCCH), a third PUCCH resource (also referred to as n(3)PUCCH), and a fourth PUCCH resource (also referred to as n(4)PUCCH).

For example, the base station device 3 may transmit higher layer signaling including first information to be used to configure the first PUCCH resource. For example, SR may be transmitted with the first PUCCH resource. The base station device 3 may transmit higher layer signaling including second information to be used to indicate periodicity and/or offset for transmission of SR. The terminal device 1 may transmit SR in accordance with a configuration made by the base station device 3. To be more specific, the terminal device 1 may transmit SR with the first PUCCH resource and/or the first PUCCH format.

The base station device 3 may indicate the first PUCCH resource through higher layer signaling and PDCCH. For example, the base station device 3 may transmit higher layer signaling including third information to be used to configure the first PUCCH resource. For example, HARQ-ACK corresponding to the second PUCCH format may be transmitted with the first PUCCH resource. The terminal device 1 may determine the first PUCCH resource on the basis of the Control Channel Element (CCE) used for the transmission of PDCCH (for example, the lowest index of CCE) and the third information. The terminal device 1 may use the first PUCCH resource for the transmission of HARQ-ACK corresponding to the second PUCCH format. To be more specific, the terminal device 1 may transmit HARQ-ACK with the first PUCCH resource and/or the second PUCCH format.

The base station device 3 may transmit higher layer signaling including fourth information to be used to configure the second PUCCH resource. For example, CSI (for example, periodic CSI) may be transmitted with the second PUCCH resource. Here, the second PUCCH resource may be configured for each of the serving cells. In other words, CSI may be reported for each of the serving cells. The base station device 3 may transmit higher layer signaling including fifth information to be used to indicate periodicity and/or offset for a periodic CSI report. Here, the fifth information may be information for each CSI process, each subframe set, and/or each serving cell. The terminal device 1 may periodically report CSI in accordance with a configuration made by the base station device 3. To be more specific, the terminal device 1 may report periodic CSI with the second PUCCH resource and/or the third PUCCH format.

The base station device 3 may indicate the third PUCCH resource through higher layer signaling and PDCCH (or Downlink Control Information transmitted on PDCCH). For example, CSI, SR, and/or HARQ-ACK corresponding to the fourth PUCCH format may be transmitted with the third PUCCH resource. For example, the base station device 3 may transmit sixth information for configuring multiple values associated with the third PUCCH resource by using higher layer signaling, and further indicate a third resource by indicating one of the above multiple values based on the value set in the field of Downlink Control Information transmitted on PDCCH (also referred to as $1^{st}$ ACK Resource Indicator ($1^{st}$ ARI)).

For example, the base station device 3 may transmit the sixth information for configuring four values corresponding to four third PUCCH resources using higher layer signaling. In addition, the base station device 3 may indicate, based on the values set in the field of Downlink Control Information transmitted on PDCCH (e.g., "00", "01", "10", or "11" set in the 2-bit information field), one of the above four values, thereby indicating one of the third resources corresponding to the one value indicated. That is, the terminal device 1 may determine, based on one value corresponding to a value set in the field of Downlink Control Information among four values corresponding to the four third PUCCH resources, one of the third PUCCH resources corresponding to the above one value.

For example, the base station device 3 may indicate the third PUCCH resource based on a value set in a transmit power command field (hereinafter, also referred to as a TPC command field) for PUCCH included in the downlink assignment for a secondary cell transmitted on PDCCH. In other words, one value corresponding to one of the third PUCCH resources may be indicated based on a value set in the TPC command field included in the downlink assignment used for indicating the transmission on PDSCH in the secondary cell.

The TPC command field included in the downlink assignment for the primary cell (in other words, downlink assignment used to indicate the transmission on PDSCH in the primary cell) may be used for the transmit power command for the transmission on PUCCH. Further, the TPC command field included in the downlink assignment for the PUCCH secondary cell (in other words, it may be downlink assignment used to indicate the transmission on PDSCH in the PUCCH secondary cell) may be used for the transmit power command for the transmission on PUCCH.

The base station device 3 may indicate the fourth PUCCH resource through higher layer signaling and PDCCH (or Downlink Control Information transmitted on PDCCH). For example, CSI, SR, and/or HARQ-ACK corresponding to the fifth PUCCH format may be transmitted with the fourth PUCCH resource.

For example, the terminal device 1 may report CSI with the second PUCCH resource and/or the third PUCCH format in a certain subframe. In other words, the second PUCCH resource is used when the terminal device 1 reports CSI with the third PUCCH format.

The terminal device 1 may report CSI using the third PUCCH resource and/or the fourth PUCCH format in a certain subframe. In other words, the third PUCCH resource is used when the terminal device 1 transmits CSI using the fourth PUCCH format.

Alternatively, the terminal device 1 may transmit CSI using the fourth PUCCH resource and/or the fifth PUCCH format in a certain subframe. In other words, the fourth PUCCH resource is used when the terminal device 1 transmits CSI using the fifth PUCCH format.

Here, the terminal device 1 may use different PUCCH formats and/or different PUCCH resources for a CSI report corresponding to each or part of the serving cells, for example. In addition, the terminal device 1 may use different PUCCH formats and/or different PUCCH resources for a CSI report corresponding to each or part of the CSI processes. Moreover, the terminal device 1 may use different PUCCH formats and/or different PUCCH resources for a CSI report corresponding to each or part of the subframe sets.

Here, different PUCCH resources may be used for multiple CSI reports using the same PUCCH format. For example, the second PUCCH resource used for a first CSI report with the third PUCCH format and the second PUCCH resource used for a second CSI report with the third PUCCH format may be different resources. For example, the second PUCCH resource used for the second CSI report may be a PUCCH resource to which indicated (configured) is a resource index different from a resource index for the second PUCCH resource used for the first CSI report. Further, the second PUCCH resource used for the second CSI report may be a PUCCH resource to which indicated (configured) is an orthogonal sequence index different from an orthogonal sequence index for the second PUCCH resource used for the first CSI report. Moreover, the second PUCCH resource used for the second CSI report may be a PUCCH resource to which indicated (configured) is a cyclic shift value different from a cyclic shift value for the second PUCCH resource used for the first CSI report.

Here, the cell index includes a serving cell index (also referred to as ServCellIndex) associated with an identity used to identify the serving cell.

A value of "0" of the serving cell index may be applied to the primary cell. An allocated secondary cell index value may be used as a serving cell index value applied to the secondary cell. Hereinafter, the secondary cell index (ScellIndex) and/or the serving cell index (ServCellIndex) is also referred to as a cell index.

Here, the base station device 3 may configure a cell index (a value of a cell index) for the terminal device 1. For example, the base station device 3 may transmit higher layer signaling including the cell index. The terminal device 1 may identify the cell index of the serving cell based on the cell index configured by the base station device 3. In other words, the cell index may be an index in a higher layer (also referred to as an index in the RRC layer or an index of RRC).

Basically, operations of the terminal device 1 will be described below. However, it goes without saying that the base station device 3 performs operations corresponding to the terminal device 1. The operations described in the present embodiment may be performed for each cell group. To be more specific, the base station device 3 and/or the terminal device 1 may perform the operations described in the present embodiment in one cell group.

For example, the operations described in the present embodiment may apply to the transmission of Uplink Control Information (e.g., CSI report transmission) in the case of PUCCH format 3 being configured. Further, the operations described in the present embodiment may apply to the transmission of Uplink Control Information (e.g., CSI report transmission) in the case of PUCCH format 4 being configured.

Further, the operations described in the present embodiment may apply in the case of one serving cell being configured. Furthermore, the operations described in the present embodiment may apply in the case of serving cells more than one being configured. In addition, the operations described in the present embodiment may apply in the case of more than five serving cells being configured. Here, the case of serving cells more than one being configured may refer to a case of more than one and up to five serving cells being configured.

Hereinafter, periodic CSI reporting using PUCCH according to the present embodiment will be described. Note that multiple CSI subframe sets may be configured in the Uplink where CSI reporting is performed.

The base station device 3 makes such a configuration in the terminal device 1 that reports periodic CSI on PUCCH using any one of reporting modes. The base station device 3 configures, for each serving cell, a reporting mode and the PUCCH resource used for periodic CSI reporting. The base station device 3 transmits, to the terminal device 1, information associated with periodic CSI for each of the serving cells.

(A) For example, the terminal device 1 in which a reporting mode 1-0 is configured does not transmit PMI. Further, the terminal device 1 in which the reporting mode 1-0 is configured does not transmit sub band CQI but transmits wide band CQI.

(B) For example, the terminal device 1 in which a reporting mode 1-1 is configured transmits PMI. Further, the terminal device 1 in which the reporting mode 1-1 is configured does not transmit sub band CQI but transmits wide band CQI.

(C) For example, the terminal device 1 in which a reporting mode 2-0 is configured does not transmit PMI. Further, the terminal device 1 in which the reporting mode 2-0 is configured transmits sub band CQI and wide band CQI.

(D) For example, the terminal device 1 in which a reporting mode 2-1 is configured transmits PMI. Further, the terminal device 1 in which the reporting mode 2-1 is configured transmits sub band CQI and wide band CQI.

Wide band CQI is calculated based on CRS and/or CSI-RS transmitted in all the physical resource blocks within a certain subframe of a certain serving cell. Sub band CQI is calculated based on CRS and/or CSI-RS transmitted in the physical resource blocks constituting a specific part of a band within a certain subframe of a certain serving cell.

Each of the CSI reporting modes supports multiple reporting types.

(A) For example, a reporting type 1 supports sub band CQI feedback.

(B) For example, a reporting type 1a supports sub band CQI and PMI feedback.

(C) For example, a reporting type 2, a reporting type 2a, and a reporting type 2b support wide band CQI and PMI feedback.

(D) For example, a reporting type 3 supports RI feedback.

(E) For example, a reporting type 4 supports wide band CQI feedback.

(F) For example, a reporting type 5 supports RI and wide band PMI feedback.

(G) For example, a reporting type 6 supports RI and PTI feedback.

In a case that the reporting mode 1-0 is configured for a certain serving cell, the terminal device 1 reports CSI of the reporting type 3 and the reporting type 4 corresponding to the stated serving cell to the base station device 3. In a case that the reporting mode 1-1 is configured for a certain serving cell, the terminal device 1 reports CSI of the reporting type 2/2b/2c, the reporting type 3, and the reporting type 5 corresponding to the stated serving cell to the base station device 3.

In a case that the reporting mode 2-0 is configured for a certain serving cell, the terminal device 1 reports CSI of the reporting type 1, the reporting type 3, and the reporting type 4 corresponding to the stated serving cell to the base station device 3. In a case that the reporting mode 2-1 is configured for a certain serving cell, the terminal device 1 reports CSI of the reporting type 1/1a, the reporting type 2/2a/2b, the reporting type 3, and the reporting type 6 corresponding to the stated serving cell to the base station device 3.

As for the terminal device 1, in a case that a transmission mode capable of configuring multiple CSI processes (e.g., the transmission mode 10) is configured in a certain serving cell and RI and/or RMI is reported in a certain CSI process, an RI-reference CSI process may be configured for the stated CSI process. In the terminal device 1, in the case where the RI-reference CSI process is configured for a certain CSI process, RI reported by the stated CSI process is the same as RI included in the most recent report on the Channel State Information including RI for the configured RI-reference CSI process. Note that, however, RI reported by the RI-reference CSI process is not based on other configured CSI processes. The terminal device 1 does not expect to receive a request for an aperiodic CSI report triggering a CSI report including CSI related to a certain CSI process and not including CSI related to the configured RI-reference CSI process in a certain subframe.

Hereinafter, reporting of RI in the report of periodic CSI (also referred to as periodic RI) according to the present embodiment will be described.

The terminal device 1 determines RI among the number of transmission layers that can be used in spatial multiplexing. RI is 1 in a case of transmission diversity. RI corresponds to Physical Downlink Shared CHannel (PDSCH) transmission and also corresponds to the number of layers determined by the terminal device 1.

One or multiple CSI processes may be configured by a higher layer for the terminal device 1. A CSI process index is configured by the higher layer for each of the CSI processes. In each of the CSI processes, whether to report PMI and/or RI is configured by signaling of the higher layer. The terminal device 1 determines one RI from among the sets supported RI values for each RI reporting interval, and reports the number of transmission layers every time RI reporting is performed.

In addition, one or multiple CSI subframe sets (e.g., CSI subframe set 0 and CSI subframe set 1) may be configured by a higher layer for the terminal device 1. For the terminal device 1 with multiple subframe sets being configured, CQI, RI, and the like may be configured for each subframe set separately (e.g., the periodicity of report timing, offset, or the like as needed).

Hereinafter, a reporting procedure of RI and CQI in each of the reporting modes will be described. Although description on RI and CQI is given below, other types of CSI (e.g., PMI, PTI, and the like) may be simultaneously reported in an arbitrary procedure.

In the case of the reporting mode 1-0, RI and CQI are calculated as follows.

(Regarding RI in the reporting mode 1-0), in the case of the transmission mode 3, the terminal device 1 determines RI assuming the transmission of the whole frequency band capable of being configured as sub bands (referred to as "set S subands" in some case) in the subframe to report RI, and then reports the determined RI using the reporting type 3.

(Regarding CQI in the reporting mode 1-0), the terminal device 1 reports CQI using the reporting type 4 including one wide band CQI having been calculated assuming the transmission of the whole frequency band capable of being configured as sub bands in the subframe to report CQI. However, in the case of the transmission mode 3, CQI is calculated based on periodic RI having been reported last. In the cases of other transmission modes, CQI is calculated in which the rank is taken as 1.

In the case of the reporting mode 1-1, RI and CQI are calculated as follows.

Regarding RI in the reporting mode 1-1: In a case that, in the subframe to report RI, the transmission mode 10 is configured and the RI-reference CSI process is configured for a certain CSI process, the terminal device 1 makes RI of the stated CSI process have the same value as RI of the most recent CSI report including RI of the configured RI-reference CSI process regardless of the configuration of the subframe set. In other cases, the terminal device 1 determines RI while assuming the transmission of the whole frequency band capable of being configured as sub bands. The terminal device 1 reports RI determined by using the reporting type 3 (in a case of RMI not included) or the reporting type 5 (in a case of PMI included).

Regarding CQI in the reporting mode 1-1: In the subframe to report CQI, the terminal device 1 reports CQI as follows in a case of a certain transmission mode (e.g., the transmission mode 4, 8, 9, or 10). In a case that the transmission mode 10 is configured in the terminal device 1, the RI-reference CSI process is configured for a certain CSI process, reporting of the most recent reporting type 3 of the stated CSI process is dropped, and reporting of the most recent reporting type 3 is performed in the RI-reference CSI process for the CSI process, CQI for the CSI process is calculated based on periodic RI having been reported in the above RI-reference CSI process. In a case that the transmission mode 10 is Configured in the terminal device 1 and the RI-reference CSI process is not configured for a certain CSI process, CQI for the stated CSI process is calculated based on periodic RI having been reported last to the CSI process. In other cases, CQI is calculated based on periodic RI having been reported last. In a case of a transmission mode other than a certain transmission mode (e.g., the transmission mode 4, 8, 9, or 10), the terminal device 1 calculates CQI (and PMI) while taking the rank of the transmission as 1.

Figure 4:
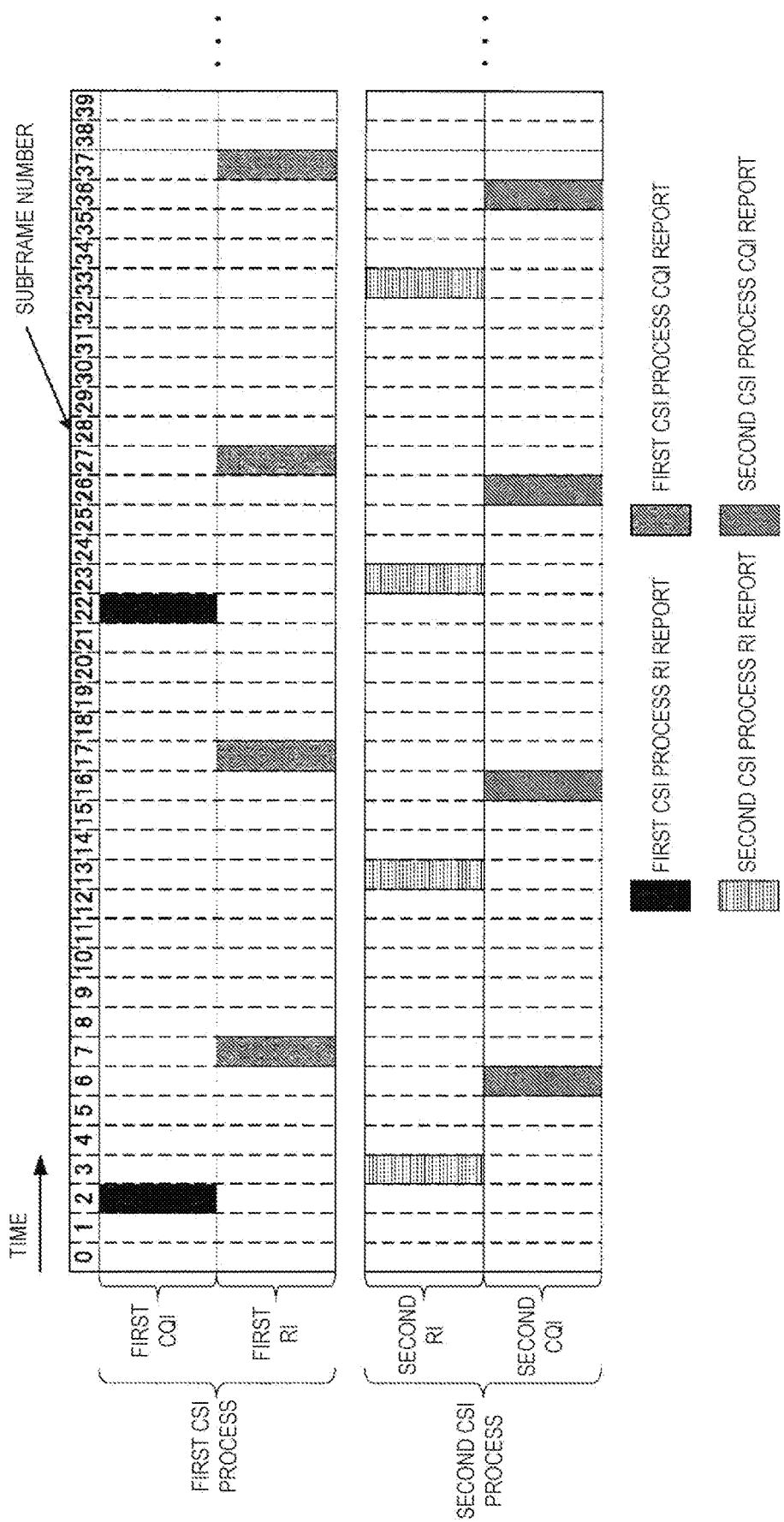
FIG. 4 is a diagram illustrating an example of a method for RI reports and CQI reports according to the present embodiment.

FIG. 4 illustrates a case in which the terminal device 1 with the transmission mode 10 being configured in a certain serving cell performs first RI reporting and first CQI reporting with respect to a first CSI process of the stated serving cell, and performs second RI reporting and second CQI reporting with respect to a second CSI process of the serving cell. It is assumed that the first CSI process is configured as the RI-reference CSI process in the second CSI process. Here, a value of second RI of the second CSI process reported at a subframe number 3 and a subframe number 13 is the same as a vale of RI reported at a subframe number 2. In a case where second RI of the second CSI process reported at a subframe number 23 is dropped due to an arbitrary condition to be explained later, second CQI of the second CQI process reported at a subframe number 26 is calculated based on RI reported at a subframe number 22 of the first CSI process as the RI-reference CSI process.

In the case of the reporting mode 2-0, RI and CQI are calculated as follows.

Regarding RI in the reporting mode 2-0: In the case of the transmission mode 3, the terminal device 1 determines RI assuming the transmission of the set S subands in the subframe to report RI, and then reports the determined RI using the reporting type 3.

Regarding wide band CQI in the reporting mode 2-0: The terminal device 1 reports CQI of the reporting type 4 including one wide band CQI having been calculated assuming the transmission of the whole frequency band capable of being configured as sub bands in the subframe to report wide band CQI. However, in the case of the transmission mode 3, CQI is calculated based on periodic RI having been reported last. In the cases of other transmission modes, CQI corresponding to the reporting mode 2-0 is calculated taking the rank as 1.

Regarding sub band CQI in the reporting mode 2-0: The terminal device 1 reports, in a subframe to report CQI of a selected sub band, a value of CQI reflecting only the transmission of the stated sub band by using the reporting type 1. The value of CQI corresponding to the reporting mode 2-0 represents only channel quality of a first codeword even in a case where RI is greater than 1. In the case of the transmission mode 3, the terminal device 1 calculates subband selection and a CQI value using periodic RI having been reported last; in the cases of other transmission modes, the terminal device 1 calculates sub-band selection and a CQI value corresponding to the reporting mode 2-0, while taking the rank as 1.

In the case of the reporting mode 2-1, RI and CQI are calculated as follows.

Regarding RI in the reporting mode 2-1: In a case that, in the subframe to report RI, the transmission mode 10 is configured and the RI-reference CSI process is configured for a certain CSI process, the terminal device 1 makes RI of the stated CSI process have the same value as RI of the most recent CSI report including RI of the configured RI-reference CSI process regardless of the configuration of the subframe set. In other cases, the terminal device 1 determines RI while assuming the transmission of the whole frequency band capable of being configured as sub bands. The terminal device 1 reports RI determined by using the reporting type 3 (in a case of PTI not included) or the reporting type 6 (in a case of PTI included).

Regarding wide band CQI in the reporting mode 2-1: In the subframe to report wide band CQI, the terminal device 1 reports wide band CQI as follows in a case of a certain transmission mode (e.g., the transmission mode 4, 8, 9, or 10). In a case that the transmission mode 10 is configured in the terminal device 1, the RI-reference CSI process is configured for a certain CSI process, reporting of the most recent reporting type 3 of the stated CSI process is dropped, and reporting of the most recent reporting type 3 of the RI-reference CSI process is performed for the CSI process, CQI for the CSI process is calculated based on periodic RI having been reported in the above RI-reference CSI process. In other cases, CQI is calculated based on periodic RI having been reported last to the CSI process. In a case of a transmission mode other than a certain transmission mode (e.g., the transmission mode 4, 8, 9, or 10), the terminal device 1 performs calculation, taking the rank of the transmission as 1, with respect to wide band CQI in the reporting mode 2-1.

Regarding sub band CQI in the reporting mode 2-1: The terminal device 1 reports, in a subframe to report a selected sub band CQI, a value of CQI of the first codeword reflecting only the transmission of the stated sub band, with the reporting type 1. However, in a case where RI is greater than 1, the terminal device 1 reports a difference between a sub band CQI index of a second codeword and a sub band CQI index of the first codeword, three bits being added to the sub band CQI. The terminal device 1 reports sub band CQI as follows in a case of a certain transmission mode (e.g., the transmission mode 4, 8, 9, or 10). In a case that the transmission mode 10 is configured in the terminal device 1, the RI-reference CSI process is configured for a certain CSI process, reporting of the most recent reporting type 3 of the stated CSI process is dropped, and reporting of the most recent reporting type 3 of the RI-reference CSI process is performed for the CSI process, sub band selection and a CQI value for the CSI process are calculated based on periodic RI having been reported in the above RI-reference CSI process. In other cases, sub band selection and a CQI value for the above CSI process are calculated based on periodic RI having been reported last. In a case of a transmission mode other than a certain transmission mode (e.g., the transmission mode 4, 8, 9, or 10), the terminal device 1 calculates a sub band selection and a CQI value taking the rank of the transmission as 1.

Operations in a case of reporting one RI or simultaneously reporting multiple RIs according to the present embodiment will be hereinafter described.

A PUCCH format for reporting of RI may be configured in each of the configured serving cells for the terminal device 1. For example, of the third PUCCH format, the fourth PUCCH format, and the fifth PUCCH format, any available PUCCH format may be configured for reporting of RI in each of the configured serving cells for the terminal device 1.

A PUCCH format for reporting of RI may be configured in each of the configured subframe sets for the terminal device 1. For example, of the third PUCCH format, the fourth PUCCH format, and the fifth PUCCH format, any available PUCCH format may be configured for reporting of RI in each of the configured subframe sets for the terminal device 1.

A PUCCH format for reporting of RI may be configured in each of the configured CSI processes for the terminal device 1. For example, of the third PUCCH format, the fourth PUCCH format, and the fifth PUCCH format, any available PUCCH format may be configured for reporting of RI in each of the configured CSI processes for the terminal device 1.

Note that whether a format capable of simultaneously reporting multiple pieces of CSI (e.g., the fifth PUCCH format) can be used may be configured in common in all the serving cells for the terminal device 1. Note that whether a format capable of simultaneously reporting multiple pieces of CSI (e.g., the fifth PUCCH format) can be used may be configured in common in all the subframe sets for the terminal device 1. Note that whether a format capable of simultaneously reporting multiple pieces of CSI (e.g., the fifth PUCCH format) can be used may be configured in common in all the CSI processes for the terminal device 1. Note that whether a format capable of simultaneously reporting multiple pieces of CSI can apply may be configured in a system where the terminal device 1 is operated, or may be configured by signaling from a higher layer for the terminal device 1.

However, in a case where a PUCCH format (e.g., the third PUCCH format) capable of reporting only one CSI is configured for a certain PUCCH (considered to be a first PUCCH) and a format capable of simultaneously reporting multiple pieces of CSI (e.g., the fifth PUCCH format) is configured for another certain PUCCH (considered to be a second PUCCH), and the first PUCCH and the second PUCCH collide with each other, CSI reported with the first PUCCH and CSI reported with the second PUCCH may be so processed as to be simultaneously reported with the second PUCCH.

That is, in the case where the transmission with the first PUCCH resource used for reporting one CSI and using the third PUCCH format and the transmission with the second PUCCH resource used for simultaneously reporting multiple pieces of CSI and using the fifth PUCCH format collide with each other, the one CSI and/or part of or all of the multiple pieces of CSI may be reported with the second PUCCH resource. In other words, in the case where reporting of one CSI using the third PUCCH format and/or the first PUCCH resource and reporting of multiple pieces of CSI using the fifth PUCCH format and/or the second PUCCH resource collide with each other, the one CSI and/or part of or all of the multiple pieces of CSI may be reported using the fifth PUCCH format and/or the second PUCCH resource.

Here, for example, the first PUCCH may be PUCCH that is used for reporting of CSI on the second CSI process of a certain serving cell (first serving cell), and the second PUCCH may be PUCCH that is used for reporting of CSI for another serving cell (second serving cell). In other words, when first CSI on the first CSI process of the first serving cell is reported with PUCCH using an arbitrary PUCCH format, second CSI on the second CSI process of the first serving cell is reported with PUCCH using the third PUCCH format, and CSI for the second serving cell is reported with PUCCH using the fifth PUCCH format; then, in a case that the second CSI report and the CSI report for the second serving cell collide with each other in a certain subframe, the terminal device 1 may report, with PUCCH using the fifth PUCCH format, the second CSI and CSI for the second serving cell which have collided with each other.

In addition, for example, the first PUCCH may be PUCCH that is used for reporting of CSI on a second subframe set of a certain serving cell (first serving cell), and the second PUCCH may be PUCCH that is used for reporting of CSI for another serving cell (second serving cell). In other words, when the first CSI on the first subframe set of the first serving cell is reported with PUCCH using an arbitrary PUCCH format, the second CSI on the second subframe set of the first serving cell is reported with PUCCH using the third PUCCH format, and CSI for the second serving cell is reported with PUCCH using the fifth PUCCH format; then, in the case that the second CSI report and the CSI report for the second serving cell collide with each other in a certain subframe, the terminal device 1 may report, with PUCCH using the fifth PUCCH format, the second CSI and CSI for the second serving cell which have collided with each other.

However, in a case where a format capable of simultaneously reporting multiple pieces of CSI (e.g., the fifth PUCCH format) is configured for the first PUCCH and a format capable of simultaneously reporting multiple pieces of CSI (e.g., the fifth PUCCH format) is configured for the second PUCCH, and the first PUCCH and the second PUCCH collide with each other, CSI reported with the first PUCCH and CSI reported with the second PUCCH may be so processed as to be simultaneously reported with one of the first PUCCH and second PUCCH.

That is, in the case where the transmission with the first PUCCH resource used for simultaneously reporting multiple pieces of the first CSI and using the fifth PUCCH format and the transmission with the second PUCCH resource used for simultaneously reporting multiple pieces of the second CSI and using the fifth PUCCH format collide with each other, the multiple pieces of first CSI and/or part of or all of the multiple pieces of second CSI may be reported with the first PUCCH resource or the second PUCCH resource. In other words, in the case where the reporting of the multiple pieces of first CSI using the fifth PUCCH format and/or the first PUCCH resource and the reporting of the multiple pieces of second CSI using the fifth PUCCH format and/or the second PUCCH resource collide with each other, the multiple pieces of first CSI and/or part of or all of the multiple pieces of second CSI may be reported using the first PUCCH resource or the second PUCCH resource. The multiple pieces of first CSI and/or part of or all of the multiple pieces of second CSI may be reported using the fifth PUCCH format.

Here, for example, the first PUCCH may be PUCCH that is used for reporting of CSI on the second CSI process of a certain serving cell (first serving cell), and the second PUCCH may be PUCCH that is used for reporting of CSI for another serving cell (second serving cell). In other words, when the first CSI on the first CSI process of the first serving cell is reported with PUCCH using an arbitrary PUCCH format, the second CSI on the second CSI process of the first serving cell is reported with PUCCH using the fifth PUCCH format, and CSI for the second serving cell is reported with PUCCH using the fifth PUCCH format; then, in a case that the second CSI report and the CSI report for the second serving cell collide with each other in a certain subframe, the terminal device 1 may report, with PUCCH using the fifth PUCCH format, the second CSI and CSI for the second serving cell which have collided with each other.

In addition, for example, the first PUCCH may be PUCCH that is used for reporting of CSI on the second subframe set of a certain serving cell (first serving cell), and the second PUCCH may be PUCCH that is used for reporting of CSI for another serving cell (second serving cell). In other words, when the first CSI on the first subframe set of the first serving cell is reported with PUCCH using an arbitrary PUCCH format, the second CSI on the second subframe set of the first serving cell is reported with PUCCH using the fifth PUCCH format, and CSI for the second serving cell is reported with PUCCH using the fifth PUCCH format; then, in the case that the second CSI report and the CSI report for the second serving cell collide with each other in a certain subframe, the terminal device 1 may report, with PUCCH using the fifth PUCCH format, the second CSI and CSI for the second serving cell which have collided with each other.

However, in a case where a PUCCH format (e.g., the third PUCCH format) capable of reporting only one CSI is configured for the first PUCCH and a PUCCH format capable of reporting only one CSI (e.g., the third PUCCH format) is configured for the second PUCCH, and the first PUCCH and the second PUCCH collide with each other, one of the CSI report reported with the first PUCCH and the CSI report reported with the second PUCCH may be so processed as to be dropped.

Here, for example, the first PUCCH may be PUCCH that is used for reporting of CSI on the second CSI process of a certain serving cell (first serving cell), and the second PUCCH may be PUCCH that is used for reporting of CSI for another serving cell (second serving cell). In other words, when the first CSI on the first CSI process of the first serving cell is reported with PUCCH using an arbitrary PUCCH format, the second CSI on the second CSI process of the first serving cell is reported with PUCCH using the third PUCCH format, and CSI for the second serving cell is reported with PUCCH using the third PUCCH format; then, in a case that the second CSI report and the CSI report for the second serving cell collide with each other in a certain subframe, the terminal device 1 may drop one of the second CSI and CSI for the second serving cell which have collided with each other.

In addition, for example, the first PUCCH may be PUCCH that is used for reporting of CSI on the second subframe set of a certain serving cell (first serving cell), and the second PUCCH may be PUCCH that is used for reporting of CSI for another serving cell (second serving cell). In other words, when the first CSI on the first subframe set of the first serving cell is reported with PUCCH using an arbitrary PUCCH format, the second CSI on the second subframe set of the first serving cell is reported with PUCCH using the third PUCCH format, and CSI for the second serving cell is reported with PUCCH using the third PUCCH format; then, in a case that the second CSI report and the CSI report for the second serving cell collide with each other in a certain subframe, the terminal device 1 may drop one of the second CSI and CSI for the second serving cell which have collided with each other.

However, in a case where a PUCCH format (e.g., the third PUCCH format) capable of reporting only one CSI is configured for the first PUCCH, a PUCCH format capable of reporting only one CSI (e.g., the third PUCCH format) is configured for the second PUCCH, and a format capable of simultaneously reporting multiple pieces of CSI (e.g., the fifth PUCCH format) is configured for the terminal device 1, and in addition the first PUCCH and the second PUCCH collide with each other, CSI reported with the first PUCCH and CSI reported with the second PUCCH may be so processed as to be simultaneously reported using a format capable of simultaneously reporting the above multiple pieces of CSI.

However, in a case where a PUCCH format (e.g., the third PUCCH format) capable of reporting only one CSI is configured for the first PUCCH, a PUCCH format capable of reporting only one CSI (e.g., the third PUCCH format) is configured for the second PUCCH, and a format capable of simultaneously reporting multiple pieces of CSI (e.g., the fifth PUCCH format) is not configured for the terminal device 1, and in addition the first PUCCH and the second PUCCH collide with each other, one of the CSI report of the first PUCCH and the CSI report of the second PUCCH may be so processed as to be dropped.

That is, the terminal device where the fifth PUCCH format used for simultaneously reporting multiple pieces of CSI is configured (where the transmission of Uplink Control Information using the fifth PUCCH format is configured), in the case where the reporting of first one CSI using the third PUCCH format and/or the first PUCCH resource and the reporting of second one CSI using the third PUCCH format and/or the second PUCCH resource collide with each other, may report the first one CSI and/or part of or all of the second one CSI using the fifth PUCCH format. The first one CSI and/or part of or all of the second one CSI may be reported with the PUCCH resource using the fifth PUCCH format.

Here, for example, the first PUCCH may be PUCCH that is used for reporting of CSI on the second CSI process of a certain serving cell (first serving cell), and the second PUCCH may be PUCCH that is used for reporting of CSI for another serving cell (second serving cell). In other words, the first CSI on the first CSI process of the first serving cell is reported with PUCCH using an arbitrary PUCCH format, the second CSI on the second CSI process of the first serving cell is reported with PUCCH using the third PUCCH format, and CSI for the second serving cell is reported with PUCCH using the third PUCCH format; then, in a case that the second CSI report and the CSI report for the second serving cell collide with each other in a certain subframe, the terminal device 1 where the fifth PUCCH format is configured may report, with PUCCH using the fifth PUCCH format, the second CSI and CSI for the second serving cell which have collided with each other while the terminal device 1 where the fifth PUCCH format is not configured may drop one of the second CSI and CSI for the second serving cell which have collided with each other.

In addition, for example, the first PUCCH may be PUCCH that is used for reporting of CSI on the second subframe set of a certain serving cell (first serving cell), and the second PUCCH may be PUCCH that is used for reporting of CSI for another serving cell (second serving cell). In other words, when the first CSI on the first subframe set of the first serving cell is reported with PUCCH using an arbitrary PUCCH format, the second CSI on the second subframe set of the first serving cell is reported with PUCCH using the third PUCCH format, and CSI for the second serving cell is reported with PUCCH using the third PUCCH format; then, in a case that the second CSI report and the CSI report for the second serving cell collide with each other in a certain subframe, the terminal device 1 where the fifth PUCCH format is configured may report, with PUCCH using the fifth PUCCH format, the second CSI and CSI for the second serving cell which have collided with each other while the terminal device 1 where the fifth PUCCH format is not configured may drop one of the second CSI and CSI for the second serving cell which have collided with each other.

The terminal device 1 may report, in a case where the reportings of multiple pieces of CSI have collided with each other and all the pieces of CSI having collided can be simultaneously reported with an applicable PUCCH format, all the pieces of CSI without dropping any of them in a certain subframe. Note that, however, in a case where a transmission mode capable of configuring multiple CSI processes (e.g., the transmission mode 10) is configured in a certain serving cell, and CSI associated with a certain CSI process and CSI associated with an RI-reference CSI process with respect to the above certain CSI process collide with each other in a certain subframe, the terminal device 1 may drop any one of the CSI reports. For example, the CSI report to be dropped may be the CSI report associated with the above-mentioned certain CSI process in which the RI-reference CSI process is configured.

In other words, the terminal device 1 may report CSI associated with the first CSI process in one subframe using one PUCCH (PUCCH resource). The terminal device 1 may report CSI associated with the second CSI process, which is different from the first CSI process, in one subframe using one PUCCH (PUCCH resource). Here, a PUCCH format to report one CSI may be used for the CSI report associated with the first CSI process. Further, the PUCCH format to report one CSI may be used for the CSI report associated with the second CSI process.

In the case where the CSI report associated with the first CSI process and the CSI report associated with the second CSI process collide with each other in one subframe, the terminal device 1 may report CSI associated with the first CSI process and part of or all of CSI associated with the second CSI process in the above one subframe using one PUCCH (PUCCH resource). The first CSI process is not the RI-reference CSI process with respect to the second CSI process. Further, a PUCCH format to simultaneously report multiple pieces of CSI may be used for the reporting of CSI associated with the first CSI process and the reporting of part of or all of CSI associated with the second CSI process.

In the case where the CSI report associated with the first CSI process and the CSI report associated with the second CSI process collide with each other in one subframe, the terminal device 1 may report one of CSI associated with the first CSI process and CSI associated with the second CSI process in the above one subframe using one PUCCH (PUCCH resource). In other words, the terminal device 1 may drop the CSI report associated with the first CSI process and report only CSI associated with the second CSI process. The terminal device 1 may drop the CSI report associated with the second CSI process and report only CSI associated with the first CSI process. Here, the first CSI process is the RI-reference CSI process with respect to the second CSI process. Further, a PUCCH format to simultaneously report multiple pieces of CSI may be used for the CSI report associated with the first CSI process or the CSI report associated with the second CSI process.

In other words, on the basis of whether the first CSI process is the RI-reference CSI process with respect to the second CSI process, the terminal device 1 may switch action whether to report both CSI associated with the first CSI process and CSI associated with the second CSI process or to drop (report) one of CSI associated with the first CSI process and CSI associated with the second CSI process. The following indicates which of CSI associated with the first CSI process and CSI associated with the second CSI process is to be dropped (drop rule, priority).

Figure 5:
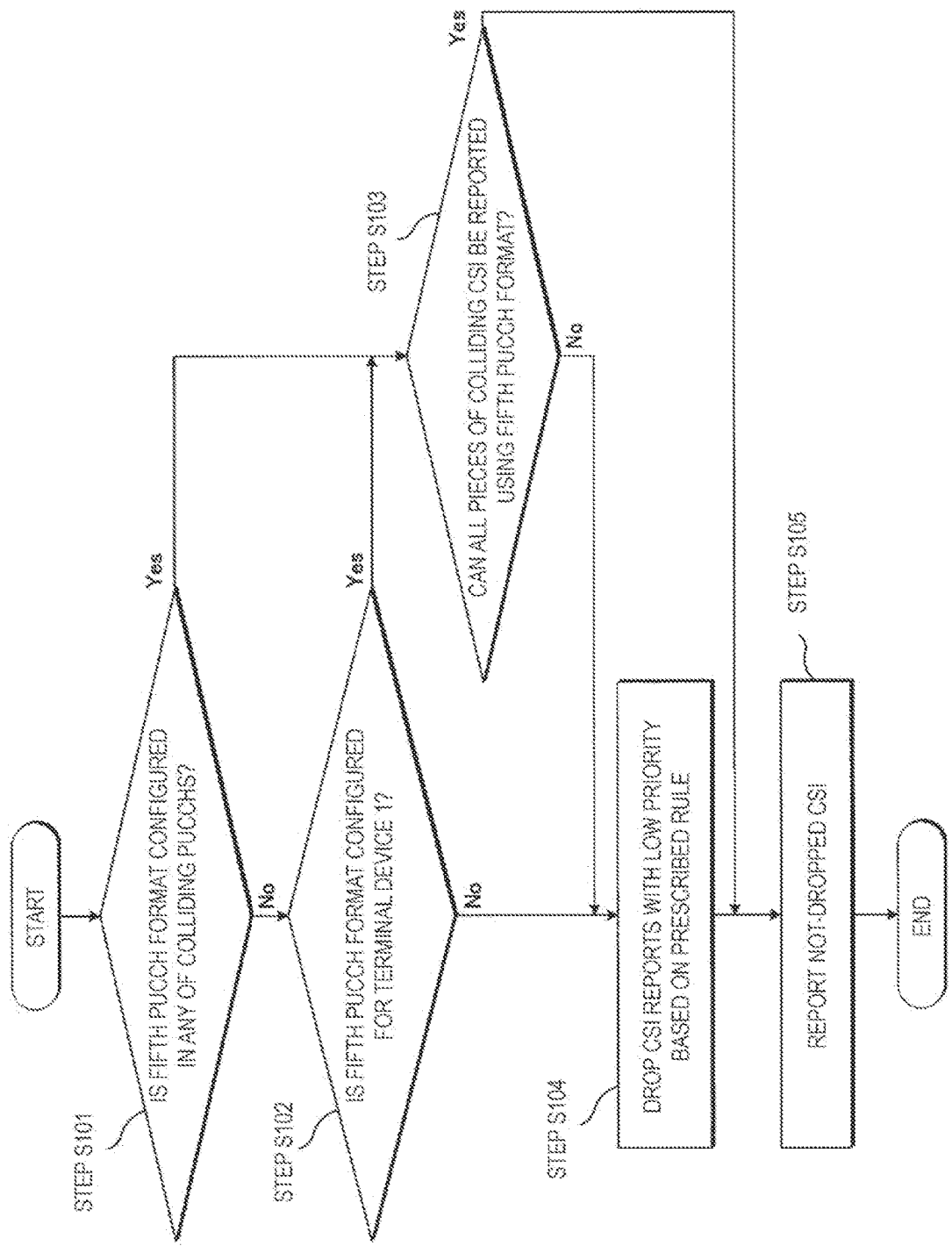
FIG. 5 is a flowchart illustrating an example of operation of a terminal device 1 when multiple PUCCHs collide, according to the present embodiment.

FIG. 5 is a flowchart illustrating an example of operation of the terminal device 1 when multiple PUCCHs transmitting CSI using respective predescribed PUCCH formats collide with each other. The fifth PUCCH format in the present flowchart may be an arbitrary format capable of simultaneously reporting multiple pieces of CSI.

In Step S101, in a case where the fifth PUCCH format is configured in any of colliding PUCCHs (S101—Yes), the process moves to Step S103; in a case where not configured (S101—No), the process moves to Step S102. In Step S102, in a case where the fifth PUCCH format is configured for the terminal device 1 (S102—Yes), the process moves to Step S103; in a case where not configured (S102—No), the process move to Step S104. In Step S103, in a case where all pieces of colliding CSI can be reported using the applicable fifth PUCCH format (S103—Yes), the process moves to Step S105; in a case where cannot be reported (S103—No), the process moves to Step S104. In Step S104, the terminal device 1 drops CSI reports with low priority based on a certain rule, which will be explained later, until the reporting can be performed using an applicable PUCCH format. In Step S105, the terminal device 1 reports all pieces of not-dropped CSI using an applicable PUCCH format.

Note that, however, in a case where a transmission mode capable of configuring multiple CSI processes (e.g., the transmission mode 10) is configured in a certain serving cell, and reporting of CSI associated with a certain CSI process (or reporting of RI as needed) and reporting of CSI associated with a CSI process in which the same RI-reference CSI process as that of the above-mentioned CSI process is configured (or reporting of RI as needed) collide with each other in a certain subframe, the terminal device 1 may consider any one of the CSI reports as the one having the lowest priority and drop it. For example, the CSI report to be dropped may be the CSI report associated with the CSI process in which the RI-reference CSI process is configured.

Figure 6:
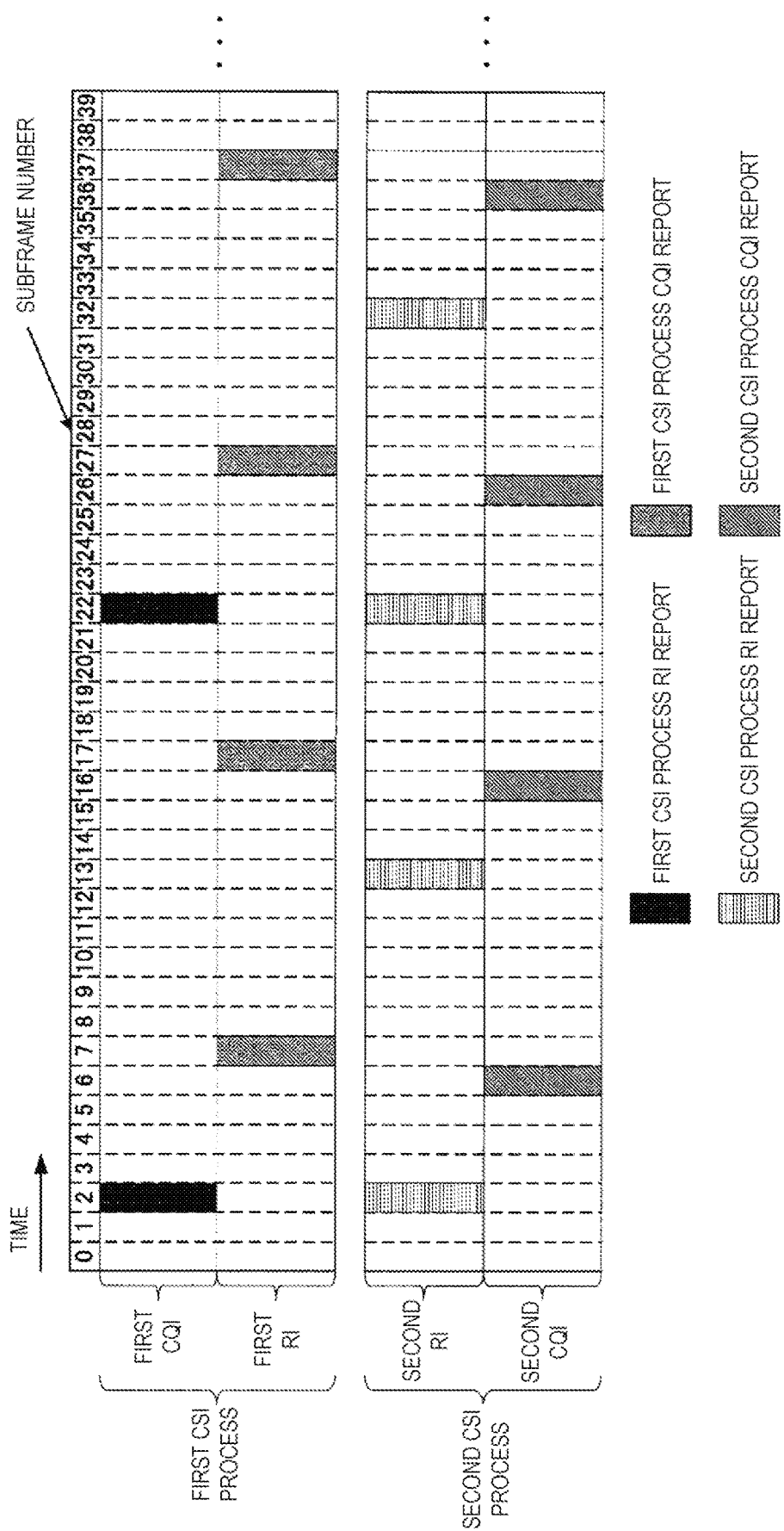
FIG. 6 is a diagram illustrating an example of a drop rule when multiple CSI reports collide, according to the present embodiment.

FIG. 6 is a diagram illustrating an example of a drop rule when multiple CSI reports collide with each other. FIG. 6 illustrates a case in which the terminal device 1 with the transmission mode 10 being configured in a certain serving cell performs reporting of a first RI and reporting of a first CQI with respect to the first CSI process of the stated serving cell, and performs reporting of a second RI and reporting of a second CQI with respect to the second CSI process of the serving cell. Here, it is assumed here that the reporting of the first RI of the first CSI process collides with the reporting of the second RI of the second CSI process at a subframe number 2 and at a subframe number 22.

In a case that a PUCCH format capable of simultaneously reporting multiple pieces of CSI cannot be applied with respect to the reporting of the first RI and the reporting of the second RI, the terminal device 1 drops one of the reporting of the first RI and the reporting of the second RI at the subframe number 2 and subframe number 22. Selection of the reporting of RI to be dropped may be performed in accordance with a rule which will be described later.

In a case that a PUCCH format capable of simultaneously reporting multiple pieces of CSI can be applied with respect to the reporting of the first RI and the reporting of the second RI, the terminal device 1 may perform processing as follows. In a case that the first CSI process is the RI-reference CSI process with respect to the second CSI process, the terminal device 1 may drop the reporting of the second RI colliding with the reporting of the first RI. In this case, the second CQI of the second CQI process at a subframe number 6 may be calculated based on the first RI of the first CSI process reported at the subframe number 2, and the second CQI of the second CSI process at a subframe number 26 may be calculated based on the first RI of the first CSI process reported at the subframe number 22. In a case that the first CSI process is not the RI-reference CSI process with respect to the second CSI process, the terminal device 1 may apply the PUCCH format capable of simultaneously reporting multiple pieces of CSI to report both the first RI and the second RI.

Figure 7:
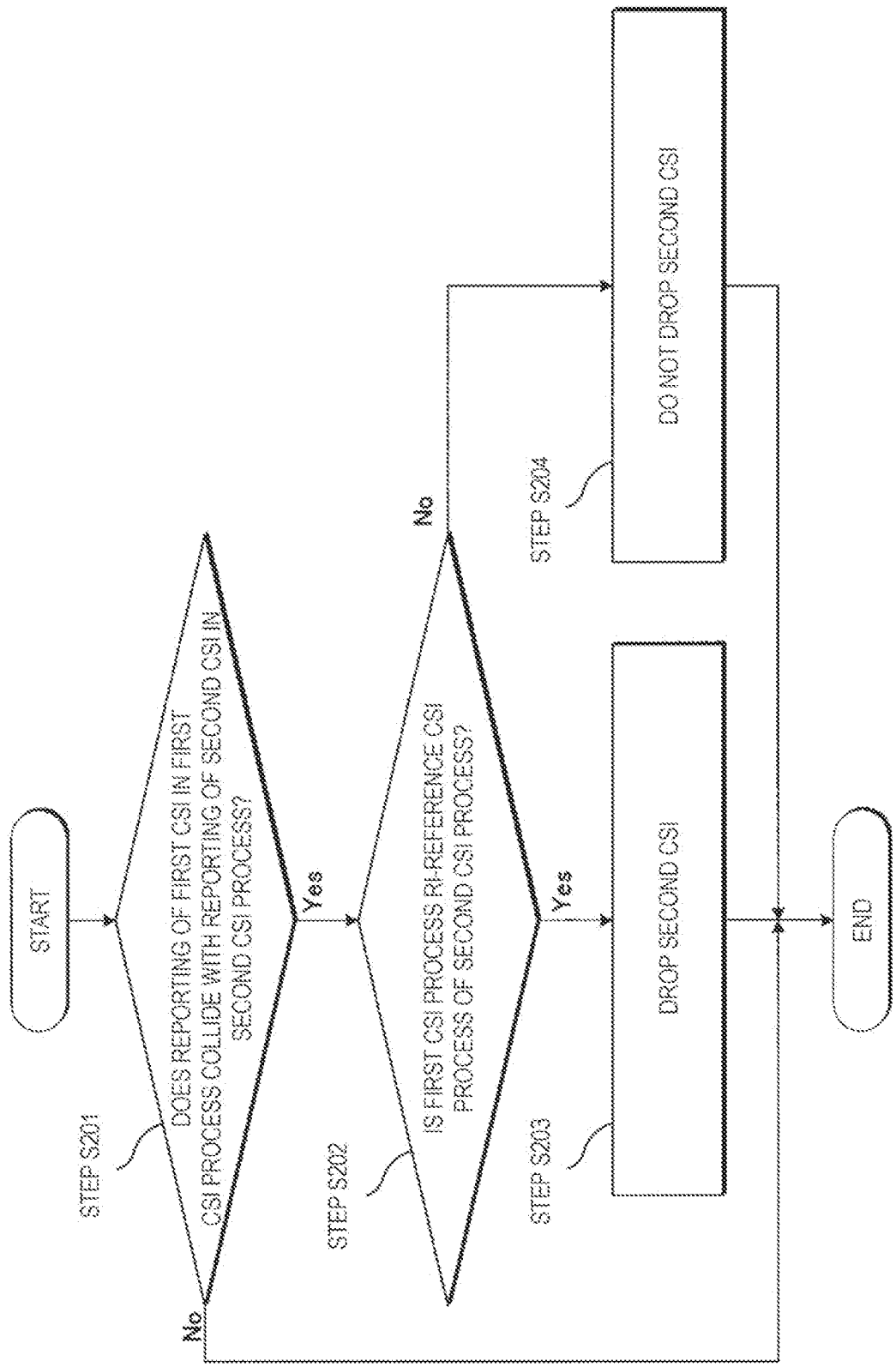
FIG. 7 is a flowchart illustrating an example of operation of the terminal device 1 when multiple CSI reports collide, according to the present embodiment.

FIG. 7 is a flowchart illustrating an example of operation of the terminal device 1 when multiple CSI reports collide with each other in a state in which a transmission mode capable of configuring multiple CSI processes (e.g., the transmission mode 10) is configured and a format capable of simultaneously reporting multiple pieces of CSI (e.g., the fifth PUCCH format) can be used. Operation of the flowchart in FIG. 7 may be added at a position immediately before Step S103 in FIG. 5 (in other words, between Step S101—Yes and Step S103 and/or between Step S102—Yes and Step S103), for example. Note that the reporting of the first CSI and the reporting of the second CSI in FIG. 7 may be the reporting of the first RI and the reporting of the second RI, respectively.

In Step S201, in a case where the reporting of the first CSI in the first CSI process collides with the reporting of the second CSI in the second CSI process (S201—Yes), the process proceeds to Step S202; in a case where does not collide (S201—No), the operation ends. Note that it is preferable for the reporting of the first CSI and the reporting of the second CSI in Step S201 to be applied to the reporting of all pieces of colliding CSI. In Step S202, in a case where the first CSI process is the RI-reference CSI process of the second CSI process (S202—Yes), the process proceeds to Step 203; in a case where the first CSI process is not the RI-reference CSI process of the second CSI process (S202—No), the process proceeds to Step S204. In Step S203, the reporting of the second CSI in the second CSI process where the first CSI process is configured in the RI-reference CSI process is dropped, and the operation is ended. In Step S204, the reporting of the second CSI in the second CSI process is not dropped, and the operation is ended.

As discussed above, even in a state in which a format capable of simultaneously reporting multiple pieces of CSI (e.g., the fifth PUCCH format) can be used, the PUCCH resource used in the reporting can be saved by dropping the reporting of CSI in a CSI process where another CSI process is configured in the RI-reference CSI process.

Although, in the above discussion, the operation of dropping taken when the reporting of CSI in a CSI process where the RI-reference CSI process is configured collides with the reporting of CSI in a referenced CSI process is illustrated, the terminal device 1 may take the operation of dropping when the reporting of CSI in a CSI process where another CSI process is configured in the RI-reference CSI process collides with the reporting of arbitrary CSI.

Hereinafter, a rule of priority when multiple CSI reports collide with each other according to the present embodiment will be described.

In a case where a CSI report of the reporting type 3, 5, or 6 of a certain serving cell collides with a CSI report of the reporting type 1, 1a, 2, 2a, 2b, 2c, or 4 of the same serving cell, and all the pieces of colliding CSI cannot be simultaneously reported with an applicable PUCCH format, the terminal device 1 considers the CSI report of the latter type (the reporting type 1, 1a, 2, 2a, 2b, 2c, or 4) as the CSI report of the reporting type with low priority.

In a case where a transmission mode capable of configuring multiple CSI processes (e.g., the transmission mode 10) is configured in a certain serving cell, multiple CSI reports of reporting types having the same priority and of different CSI processes collide with each other, and all the pieces of colliding CSI cannot be simultaneously reported with the applicable PUCCH format, the terminal device 1 considers CSI of a CSI process with a larger CSI process index as a CSI report of a CSI process with low priority.

In a case where a transmission mode capable of configuring one CSI process (e.g., the transmission modes 1 to 9) is configured in a certain serving cell, the CSI subframe set 0 and the CSI subframe set 1 are configured by higher layer parameters, CSI reports of reporting types having the same priority collide with each other in the same serving cell, and all the pieces of colliding CSI cannot be simultaneously reported with the applicable PUCCH format, the terminal device 1 considers the CSI report of the CSI subframe set 1 as the CSI report of a subframe set with low priority.

In a case where a transmission mode capable of configuring multiple CSI processes (e.g., the transmission mode 10) is configured in a certain serving cell, the CSI subframe set 0 and the CSI subframe set 1 are configured by the higher layer parameters, CSI reports of reporting types having the same priority and of the same CSI process index collide with each other in the same serving cell, and all the pieces of colliding CSI cannot be simultaneously reported with the applicable PUCCH format, the terminal device 1 considers the CSI report of the CSI subframe set 1 as the CSI report of a subframe set with low priority.

In a case where multiple serving cells are configured in the terminal device 1 and a PUCCH format capable of reporting only CSI for one serving cell is applied, the terminal device 1 transmits a CSI report of only one serving cell per subframe. In a case where a CSI report of the reporting type 3, 5, 6, or 2a of a certain serving cell collides with a CSI report of the reporting type 1, 1a, 2, 2b, 2c, or 4 of a different serving cell in a certain subframe, and all the pieces of colliding CSI cannot be simultaneously reported with an applicable PUCCH format, the CSI report of the latter type (the reporting type 1, 1a, 2, 2b, 2c, or 4) is considered as the CSI report of the reporting type with low priority. In a case where a CSI report of the reporting type 2, 2b, 2c, or 4 of a certain serving cell collides with a CSI report of the reporting type 1 or 1a of a different serving cell in a certain subframe, and all the pieces of colliding CSI cannot be simultaneously reported with an applicable PUCCH format, the CSI report of the latter type (the reporting type 1 or 1a) is considered as the CSI report of the reporting type with low priority.

In a case where a transmission mode capable of configuring one CSI process (e.g., the transmission modes 1 to 9) is configured in multiple serving cells of a certain subframe, CSI reports of reporting types having the same priority collide with each other in different serving cells, and all the pieces of colliding CSI cannot be simultaneously reported with an applicable PUCCH format, the terminal device 1 considers the CSI report of the serving cell with a larger cell index configured at a higher layer as the CSI report of the serving cell with low priority.

In a case where a transmission mode capable of configuring multiple CSI processes (e.g., the transmission mode 10) is configured in multiple serving cells of a certain subframe, CSI reports of reporting types having the same priority and of the same CSI process index collide with each other in different serving cells, and all the pieces of colliding CSI cannot be simultaneously reported with an applicable PUCCH format, the terminal device 1 considers the CSI report of the serving cell with a larger cell index configured at a higher layer as the CSI report of the serving cell with low priority.

In a case where a transmission mode capable of configuring multiple CSI processes (e.g., the transmission mode 10) is configured in multiple serving cells of a certain subframe, CSI reports of reporting types having the same priority and of different CSI process indices collide with each other in different serving cells, and all the pieces of colliding CSI cannot be simultaneously reported with an applicable PUCCH format, the terminal device 1 considers the CSI report of the serving cell with CSI of the CSI process having a larger CSI process index as the CSI report of the serving cell with low priority.

In a case where, in a certain subframe, a CSI report of a serving cell where a transmission mode capable of configuring one CSI process (e.g., the transmission modes 1 to 9) is configured collides with a CSI report of a different serving cell where a transmission mode capable of configuring multiple CSI processes (e.g., the transmission mode 10) is configured, the reporting types of CSI of these serving cells have the same priority, and all the pieces of colliding CSI cannot be simultaneously reported with an applicable PUCCH format, the terminal device 1 considers, as for the CSI report of the latter serving cell with the CSI process index being greater than 1, the CSI report of the CSI process having a larger CSI process index as the CSI report of the CSI process with lower priority.

In a case where, in a certain subframe, a CSI report of a serving cell where a transmission mode capable of configuring one CSI process (e.g., the transmission modes 1 to 9) is configured collides with a CSI report of a CSI process with a CSI process index of 1 of a different serving cell where a transmission mode capable of configuring multiple CSI processes (e.g., the transmission mode 10) is configured, and the reporting types of CSI of these serving cells have the same priority, the terminal device 1 considers the CSI report of the serving cell with a larger cell index configured at a higher layer as the CSI report of the serving cell with low priority.

In the case where multiple CSI reports collide with each other and all pieces of colliding CSI cannot be simultaneously reported with an applied PUCCH format, the terminal device 1 drops the CSI report with lower priority according to the above-discussed rule. At the point in time when, after having dropped the CSI reports in the order from the lower priority, the remaining not-dropped CSI reports can be simultaneously reported with an applied PUCCH format, the dropping processing may be ended and the CSI report processing may be performed.

However, as discussed above, in the case where a CSI report of the CSI process where an RI-reference CSI process is configured and a CSI report of the referenced CSI process are included in at least part of the multiple CSI reports colliding with each other, the CSI report of the CSI process where the RI-reference CSI process is configured may be dropped regardless of whether the simultaneous reporting can be performed with an applied PUCCH format.

Next, an embodiment of a case in which reporting of CSI is performed in multiple uplink cells.

Figure 8:
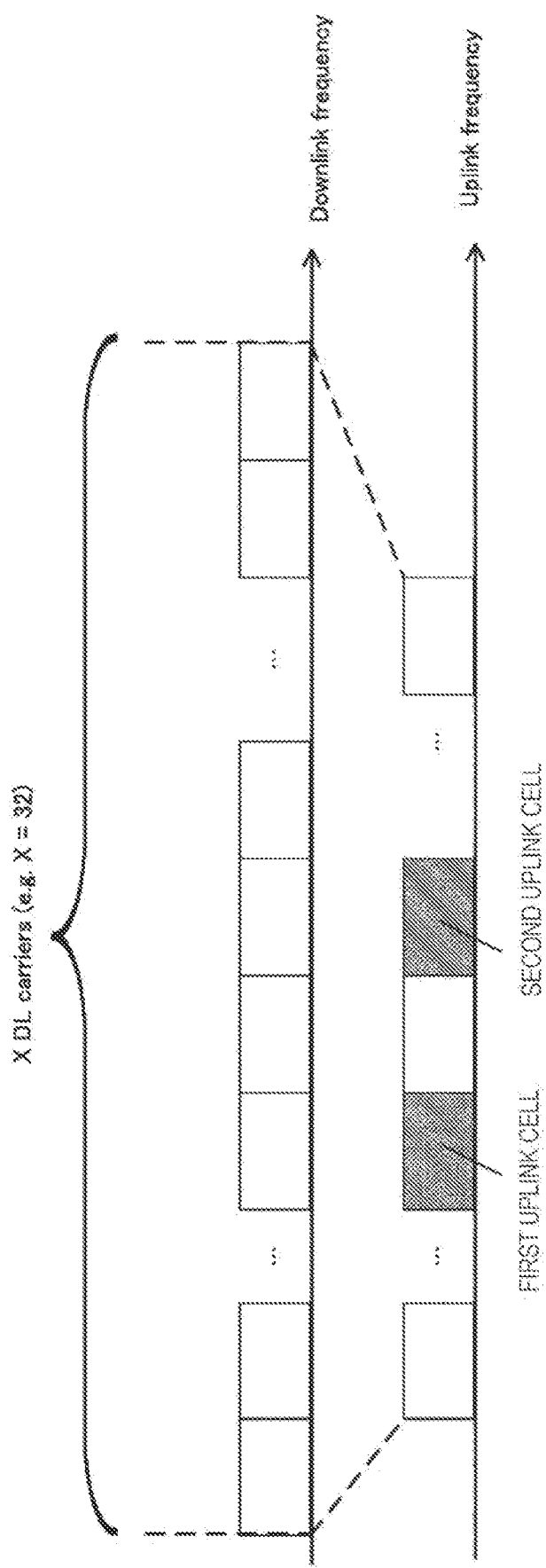
FIG. 8 is a diagram illustrating an example in which the terminal device 1 performs CSI reporting in multiple uplink cells according to the present embodiment.

FIG. 8 is a schematic diagram illustrating a case in which the reporting of CSI is performed in at least two uplink cells. At a downlink frequency, 32 serving cells are configured, and the reporting of CSI is performed in a first uplink cell and a second uplink cell.

At this time, in a case where, in a certain subframe, reporting of CSI of serving cells of X cells in the first uplink cell and reporting of serving cells of Y cells in the second uplink cell are configured or required, in a case where the number of CSI reports of X+Y to be transmitted in the stated subframe exceeds a certain value Z, of the CSI reports of the cell number X so configured or required as to be transmitted in the first uplink cell and the CSI reports of the cell number Y so configured or required to be transmitted in the second uplink cell, the CSI reports with low priority are dropped or are not updated. In other words, the CSI reports in the number of (X+Y)−Z are dropped or are not updated.

The CSI report of the first uplink cell may be a Periodic report transmitted on PUCCH or an Aperiodic report transmitted on PUSCH. Further, the CSI report of the first uplink cell may be a Periodic report transmitted on PUCCH or an Aperiodic report transmitted on PUSCH. Here, the number of periodic CSI reports refers to the number of CSI reports included in the payload of PUCCH when transmission is performed on one PUCCH in a certain subframe. Likewise, the number of aperiodic CSI reports refers to the number of CSI reports included in the payload of PUCCH when transmission is performed on one PUCCH in a certain subframe. For example, two periodic CSI reports denote that the number of CSI reports periodically transmitted is two.

X and Y may be not only the number of serving cells, but also the number of CSI processes or the total of the numbers of serving cells and processes.

When the first uplink cell performs reporting of CSI on PUCCH and the second uplink cell performs reporting of CSI on PUSCH, it may not be expected that all the CS reports of the Y number are updated except for the CSI reports of the number of max (Z−X, 0). At this time, the CSI reports of the number of max (Z−X, 0) may be determined in accordance with the collision rule (the aforementioned reporting type) at the time of periodic CSI reporting, or may be determined by the serving cell index and/or the CSI process index. The priority may be determined as follows: (i) aperiodic CSI reports are more prioritized than periodic CSI reports, (ii) more than periodic CSI reports, aperiodic CSI reports are prioritized, and (iii) CSI reports of the primary PUCCH cell group are more prioritized than CSI reports of the secondary PUCCH cell group.

For example, in a case where the certain number Z is taken as 5, and two periodic CSI reports collide with four aperiodic CSI reports, one of the CSI reports periodically transmitted and having low priority is not updated.

For example, in a case where the certain number Z is taken as 5, and two periodic CSI reports collide with five aperiodic CSI reports, all the periodic CSI reports may not be updated or may be dropped.

Although, in the above, aperiodic CSI reports are prioritized, periodic CSI reports may have priority in being supplied with power in a power-limited case (a case in which transmission with transmit power for reception with target reception power cannot be performed).

The priority in the power-limited case may have the following relation: periodic and aperiodic CSI reports of the primary cell group>periodic and aperiodic CSI reports of the secondary cell group. The priority in the case of whether to update CSI may also have the following relation: periodic and aperiodic CSI reports of the primary cell group>periodic and aperiodic CSI reports of the secondary cell group.

In a case where periodic CSI reports in PCG, periodic CSI reports in SCG, and aperiodic CSI reports in SCG collide with each other, and the total of X+Y of the periodic CSI reports of the number X in PCG and the aperiodic CSI reports of the number Y in SCG exceeds Z, the aperiodic CSI reports of the number Y in SCG are dropped and further part of the periodic CSI reports of the number X or the aperiodic CSI reports of the number Y in SCG exceeding the certain number Z are not updated or are dropped.

Thus far, methods/processes related to the transmission of the Uplink Control Information have been described referring to the drawings, but the specific configuration is not limited to the above description and includes an amendment to a design or the like that falls within the scope that does not depart from the gist of the present invention. Furthermore, as for the present embodiment, an embodiment achieved by appropriately combining the above-described methods/processes is also included in the technical scope of the present invention.

A configuration of each device according to the present embodiment will be described below.

Figure 9:
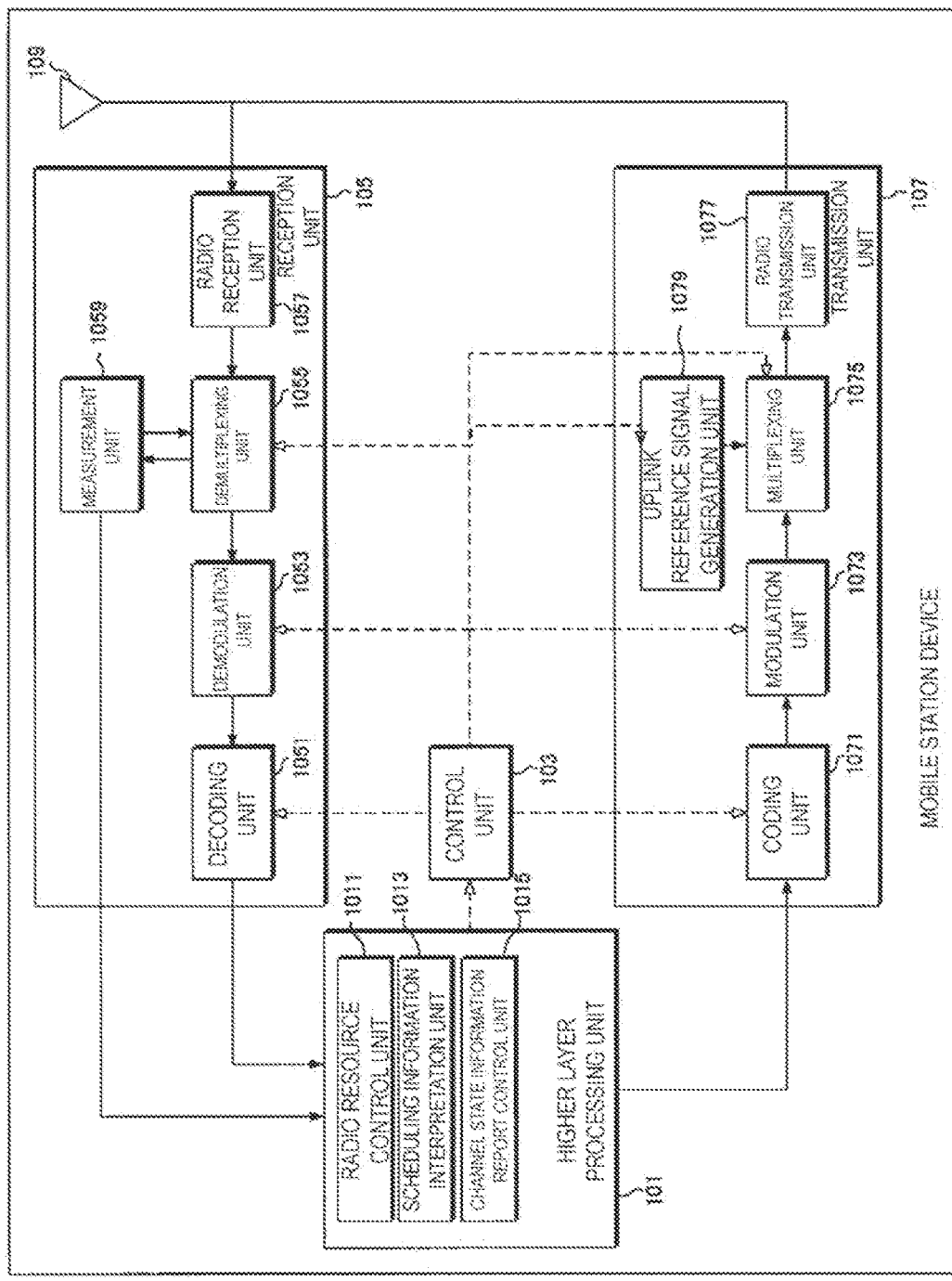
FIG. 9 is a schematic block diagram illustrating a configuration of the terminal device 1 according to the present embodiment.

FIG. 9 is a schematic block diagram illustrating a configuration of the terminal device 1 according to the present embodiment. As illustrated in FIG. 9, the terminal device 1 is configured to include a higher layer processing unit 101, a control unit 103, a reception unit 105, a transmission unit 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal device 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The CSI report control unit 1015 instructs the measurement unit 1059 to derive Channel State Information (RI/PMI/CQI) relating to the CSI reference resource. The CSI report control unit 1015 instructs the transmission unit 107 to transmit RI/PMI/CQI. The CSI report control unit 1015 sets a configuration that is used when the measurement unit 1059 calculates CQI.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and/or receive antenna 109, and outputs the resulting information to the higher layer processing unit 101.

The radio reception unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into PHICH, PDCCH, EPDCCH, PDSCH, and the downlink reference signal. Furthermore, the demultiplexing unit 1055 makes a compensation of channels including PHICH, PDCCH, EPDCCH, and PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes PHICH destined for the terminal device 1 itself and outputs the HARQ indicator resulting from the decoding to the higher layer processing unit 101. The demodulation unit 1053 demodulates PDCCH and/or EPDCCH in compliance with a QPSK modulation scheme and outputs a result of the demodulation to the decoding unit 1051. The decoding unit 1051 attempts to decode PDCCH and/or EPDCCH. In a case of succeeding in the decoding, the decoding unit 1051 outputs Downlink Control Information resulting from the decoding and RNTI to which Downlink Control Information corresponds, to the higher layer processing unit 101.

The demodulation unit 1053 demodulates PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information about a coding rate notified with the Downlink Control Information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes PUCCH, PUSCH, and the generated uplink reference signal, and transmits a result of the multiplexing to the base station device 3 through the transmit and/or receive antenna 109.

The coding unit 1071 performs coding on the Uplink Control Information and the uplink data input from the higher layer processing unit 101. The modulation unit 1073 modulates the coding bits input from the coding unit 1071, in compliance with the modulation scheme such as BPSK, QPSK, 16 QAM, or 64 QAM.

The uplink reference signal generation unit 1079 generates a sequence acquired according to a rule (formula) certain in advance, based on a physical cell identifier (also referred to as a Physical Cell Identity (PCI), a cell ID, or the like) for identifying the base station device 3, a bandwidth to which the uplink reference signal is mapped, a cyclic shift notified with the uplink grant, a parameter value for generation of a DMRS sequence, and the like.

On the basis of the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of PUSCH. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (upconverts) the signal of the intermediate frequency into a signal of a high frequency, removes unnecessary frequency components, performs power amplification, and outputs a final result to the transmit and/or receive antenna 109 for transmission.

Figure 10:
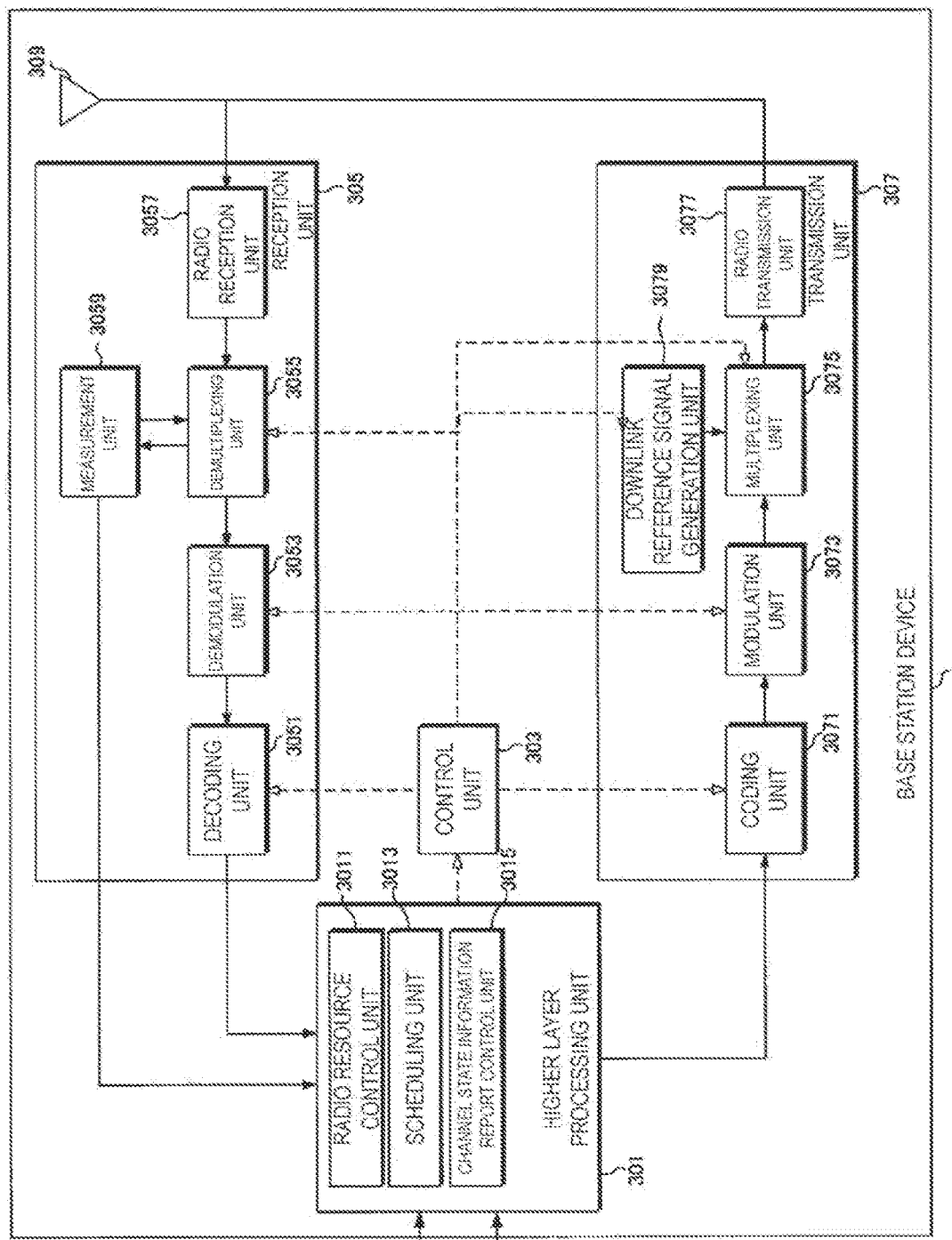
FIG. 10 is a schematic block diagram illustrating a configuration of a base station device 3 according to the present embodiment.

FIG. 10 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a CSI report control unit 3015. The reception unit 305 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information for each of the terminal devices 1.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received CSI and from the channel estimate, channel quality, or the like input from the measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates the information (e.g., the DCI format) to be used for the scheduling of the physical channels (PDSCH and PUSCH), based on the result of the scheduling.

The CSI report control unit 3015 included in the higher layer processing unit 301 controls a CSI report that is made by the terminal device 1. The CSI report control unit 3015 transmits information that is assumed in order for the terminal device 1 to derive RI/PMI/CQI in the CSI reference resource and that shows various configurations, to the terminal device 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio reception unit 3057 into PUCCH, PUSCH, and the signal such as the uplink reference signal. The demultiplexing is performed based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including PUCCH and PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on PUSCH, acquires modulation symbols, and performs reception signal demodulation, that is, demodulates each of the modulation symbols on PUCCH and PUSCH, in compliance with the modulation scheme certain in advance, such as Binary Phase Shift Keying (BPSK), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of multiple pieces of uplink data transmitted on the same PUSCH with MIMO SM, based on the number of spatial-multiplexed sequences notified in advance with the uplink grant to each of the terminal devices 1 and information indicating the precoding to be performed on the sequences.

The decoding unit 3051 decodes the coding bits of PUCCH and PUSCH, which have been demodulated, at the coding rate in compliance with a coding scheme certain in advance, the coding rate being certain in advance or being notified in advance with the uplink grant to the terminal device 1 by the base station device 3 itself, and outputs the decoded uplink data and uplink control information to the higher layer processing unit 101. In a case that PUSCH is re-transmitted, the decoding unit 3051 performs the decoding with the coding bits input from the higher layer processing unit 301 and retained in an HARQ buffer, and the demodulated coding bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the Downlink Control Information, and the downlink data that are input from the higher layer processing unit 301, multiplexes PHICH, PDCCH, EPDCCH, PDSCH, and the downlink reference signal, and transmits a result of the multiplexing to the terminal device 1 through the transmit and/or receive antenna 309.

The coding unit 3071 performs coding on the HARQ indicator, the Downlink Control Information and the downlink data input from the higher layer processing unit 301. The modulation unit 3073 modulates the coding bits input from the coding unit 3071, in compliance with the modulation scheme such as BPSK, QPSK, 16 QAM, or 64 QAM.

The downlink reference signal generation unit 3079 generates, as the downlink reference signal, a sequence that is already known to the terminal device 1 and that is acquired in accordance with a rule certain in advance based on the physical cell identity (PCI) for identifying the base station device 3, or the like.

The multiplexing unit 3075, in accordance with the number of PDSCH layers to be spatial-multiplexed, maps one or multiple pieces of downlink data to be transmitted on one PUSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

(1) To be more specific, a terminal device 1 according to a first aspect of the present invention may include: a reception unit configured to receive from a base station device first information for one or multiple first channel state information reports on a physical uplink channel in a first serving cell, and to receive from the base station device second information for multiple second channel state information reports on a physical uplink channel in a second serving cell; and a transmission unit configured to perform the first channel state information report, and to perform the second channel state information reports. Further, the total of the number of the first channel state information reports and the number of the second channel state information reports in a first subframe does not exceed a certain number, and the total of the number of the first channel state information reports in a second subframe and the number of the second channel state information reports in a third subframe exceeds the certain number.

(2) In the above first aspect, the one or multiple first channel state information reports may be a Periodic channel state information report or an Aperiodic channel state information report, and the multiple second channel state information reports may be Periodic channel state information reports or Aperiodic channel state information reports.

(3) A terminal device 1 according to a second aspect of the present invention may include: a reception unit configured to receive from a base station device first information for one or multiple first channel state information reports on a physical uplink channel in a first serving cell, and to receive from the base station device second information for multiple second channel state information reports on a physical uplink channel in a second serving cell; and a transmission unit configured to perform the first channel state information report, and to perform the second channel state information reports. In a case that the total of the number of the first channel state information reports and the number of the second channel state information reports in a first subframe exceeds a first certain number, a second certain number of the one or multiple first channel state information reports and the multiple second channel state information reports are dropped, where the second certain number is a number obtained by subtracting the first certain number from the total of the number of the one or multiple first channel state information reports and the number of the multiple second channel state information reports.

(4) In the above second aspect, the one or multiple first channel state information reports may be a Periodic channel state information report or an aperiodic channel state information report, and the multiple second channel state information reports may be Periodic channel state information reports or Aperiodic channel state information reports.

(5) In the above second aspect, the channel state information reports to be dropped may be determined based on a priority, and the stated priority may be defined based on whether the report is the Periodic channel state information report or the Aperiodic channel state information report.

(6) In the above second aspect, the channel state information reports to be dropped may be determined based on a priority of a cell group, and the cell groups may be a first cell group including a primary cell and a second cell group not including the primary cell.

(7) In the above second aspect, the reception unit may receive from the base station device third information for one or multiple third channel state information reports on a physical uplink channel in the first serving cell, and the transmission unit may perform the third channel state information report. In a case that the first channel state information report collides with the third channel state information report in a second subframe, all the channel state information reports of one of the first channel state information reports and the third channel state information reports may be dropped. One of the first channel state information report and the third channel state information report may be a Periodic channel state information report while the other one of the first channel state information report and the third channel state information report may be an Aperiodic channel state information report.

(8) A terminal device 1 according to a third aspect of the present invention may include: a reception unit configured to receive from a base station device first information for one or multiple first channel state information reports corresponding to one or multiple first channel state information processes on a physical uplink channel in a first serving cell, and to receive from the base station device second information for multiple second channel state information reports corresponding to multiple second channel state information processes on a physical uplink channel in a second serving cell; and a transmission unit configured to perform the first channel state information report, and to perform the second channel state information reports. Further, the total of the number of the first channel state information reports and the number of the second channel state information reports in a first subframe does not exceed a certain number, and the total of the number of the first channel state information reports in a second subframe and the number of the second channel state information reports in a third subframe exceeds the certain number.

(9) In the above third aspect, the one or multiple first channel state information reports may be a Periodic channel state information report or an Aperiodic channel state information report, and the multiple second channel state information reports may be Periodic channel state information reports or Aperiodic channel state information reports.

(10) A terminal device 1 according to a fourth aspect of the present invention may include: a reception unit configured to receive from a base station device first information for one or multiple first channel state information reports corresponding to one or multiple first channel state information processes on a physical uplink channel in a first serving cell, and to receive from the base station device second information for multiple second channel state information reports corresponding to multiple second channel state information processes on a physical uplink channel in a second serving cell; and a transmission unit configured to perform the one or multiple pieces of first channel state information report, and to perform the multiple second channel state information reports. In a case that the total of the number of the first channel state information reports and the number of the second channel state information reports in a first subframe exceeds a first certain number, a second certain number of channel state information reports of the one or multiple first channel state information reports and the multiple second channel state information reports are dropped, where the second certain number is a number obtained by subtracting the first certain number from the total of the number of the one or multiple first channel state information reports and the number of the multiple second channel state information reports.

(11) In the above fourth aspect, the one or multiple first channel state information reports may be a Periodic channel state information report or an Aperiodic channel state information report, and the multiple second channel state information reports may be Periodic channel state information reports or Aperiodic channel state information reports.

(12) In the above fourth aspect, the channel state information reports to be dropped may be determined based on a priority, and the priority may be defined based on whether the report is the Periodic channel state information report or the Aperiodic channel state information report.

(13) In the above fourth aspect, the channel state information reports to be dropped may be determined based on a priority of cell groups, and the cell group may be a first cell group including a primary cell and a second cell group not including the primary cell.

(14) In the above fourth aspect, the reception unit may receive from the base station device third information for one or multiple third channel state information reports corresponding to one or multiple third channel state information processes on a physical uplink channel in the first serving cell, and the transmission unit may perform the third channel state information report. In a case that the first channel state information report collides with the third channel state information report in a second subframe, all the channel state information reports of one side of the first channel state information reports and the third channel state information reports may be dropped. One of the first channel state information report and the third channel state information report may be a Periodic channel state information report while the other one of the first channel state information report and the third channel state information report may be an Aperiodic channel state information report.

(15) A base station device 3 according to a fifth aspect of the present invention may include: a transmission unit configured to transmit to a terminal device first information for one or multiple first channel state information reports on a physical uplink channel in a first serving cell, and transmit to the terminal device second information for multiple second channel state information reports on a physical uplink channel in a second serving cell; and a reception unit configured to receive the first channel state information reports, and to receive the above second channel state information reports. Further, the total of the number of the first channel state information reports and the number of the second channel state information reports in a first subframe does not exceed a certain number, and the total of the number of the first channel state information reports in a second subframe and the number of the second channel state information reports in a third subframe may exceed the certain number.

(16) In the above fifth aspect, the one or multiple first channel state information reports may be a Periodic channel state information report or an Aperiodic channel state information reports, and the multiple second channel state information reports may be Periodic channel state information reports or Aperiodic channel state information reports.

(17) A base station device 3 according to a sixth aspect of the present invention may include: a transmission unit configured to transmit to a terminal device first information for one or multiple first channel state information reports on a physical uplink channel in a first serving cell, and transmit to the terminal device second information for multiple second channel state information reports on a physical uplink channel in a second serving cell; and a reception unit configured to receive the above first channel state information reports, and to receive the above second channel state information reports. In a case that the total of the number of the first channel state information reports and the number of the second channel state information reports in a first subframe exceeds a first certain number, a second certain number of channel state information reports of the one or multiple first channel state information reports and the multiple second channel state information reports are dropped where the second certain number may be a number obtained by subtracting the first certain number from the total of the number of the one or multiple first channel state information reports and the number of the multiple second channel state information reports.

(18) In the above sixth aspect, the one or multiple first channel state information reports may be a Periodic channel state information reports or an Aperiodic channel state information reports, and the multiple second channel state information reports may be Periodic channel state information reports or Aperiodic channel state information reports.

(19) In the above sixth aspect, the channel state information reports to be dropped may be determined based on a priority, and the stated priority may be defined based on whether the report is the Periodic channel state information report or the Aperiodic channel state information report.

(20) In the above sixth aspect, the channel state information reports to be dropped may be determined based on a priority of a cell group, and the cell group may be a first cell group including a primary cell and a second cell group not including the primary cell.

(21) In the above sixth aspect, the transmission unit may transmit third information, to the terminal device, for one or multiple third channel state information reports on a physical uplink channel in the first serving cell, and the reception unit may receive the above third channel state information reports. In a case that the first channel state information report collides with the third channel state information report in a second subframe, all the channel state information reports of one side of the first channel state information reports and the third channel state information reports may be dropped. One of the first channel state information report and the third channel state information report may be a Periodic channel state information report while the other one of the first channel state information report and the third channel state information report may be an Aperiodic channel state information report.

(22) A base station device 3 according to a seventh aspect of the present invention may include: a transmission unit configured to transmit to a terminal device first information for one or multiple first channel state information reports corresponding to one or multiple first channel state information processes on a physical uplink channel in a first serving cell, and to transmit to the terminal device second information for multiple second channel state information reports corresponding to multiple second channel state information processes on a physical uplink channel in a second serving cell; and a reception unit configured to receive the above first channel state information reports, and to receive the second channel state information reports. Further, the total of the number of the first channel state information reports and the number of the second channel state information reports in a first subframe does not exceed a certain number, and the total of the number of the first channel state information reports in a second subframe and the number of the second channel state information reports in a third subframe may exceed the certain number.

(23) In the above seventh aspect, the one or multiple first channel state information reports may be a Periodic channel state information reports or an Aperiodic channel state information reports, and the multiple second channel state information reports may be Periodic channel state information reports or Aperiodic channel state information reports.

(24) A base station device 3 according to an eighth aspect of the present invention may include: a transmission unit configured to transmit to a terminal device first information for one or multiple first channel state information reports corresponding to one or multiple first channel state information processes on a physical uplink channel in a first serving cell, and to transmit to the terminal device second information for multiple second channel state information reports corresponding to multiple second channel state information processes on a physical uplink channel in a second serving cell; and a reception unit configured to receive the one or multiple first channel state information reports, and to receive the above multiple second channel state information reports. In a case that the total of the number of the first channel state information reports and the number of the second channel state information reports in a first subframe exceeds a first certain number, a second certain number of channel state information reports of the one or multiple first channel state information reports and the multiple second channel state information reports are dropped, where the second certain number may be a number obtained by subtracting the first certain number from the total of the number of the one or multiple first channel state information reports and the number of the multiple second channel state information reports.

(25) In the above eighth aspect, the one or multiple first channel state information reports may be a Periodic channel state information reports or an Aperiodic channel state information reports, and the multiple second channel state information reports may be Periodic channel state information reports or Aperiodic channel state information reports.

(26) In the above eighth aspect, the channel state information reports to be dropped may be determined based on a priority, and the stated priority may be defined based on whether the report is the Periodic channel state information report or the Aperiodic channel state information report.

(27) In the above eighth aspect, the channel state information reports to be dropped may be determined based on a priority of a cell group, and the cell group may be a first cell group including a primary cell and a second cell group not including the primary cell.

(28) In the above eighth aspect, the transmission unit may transmit to the terminal device third information for one or multiple third channel state information reports corresponding to one or multiple third channel state information processes on a physical uplink channel in the first serving cell, and the reception unit may receive the above third channel state information reports. In a case that the first channel state information report collides with the third channel state information report in a second subframe, all the channel state information reports of one of the first channel state information reports and the third channel state information reports may be dropped. One of the first channel state information report and the third channel state information report may be a Periodic channel state information report while the other one of the first channel state information report and the third channel state information report may be an Aperiodic channel state information report.

(29) A terminal device 1 according to a ninth aspect of the present invention may include: a reception unit configured to receive from a base station device first information for one or multiple first channel state information reports on a physical uplink channel in a first serving cell, and to receive from the base station device second information for multiple second channel state information reports on a physical uplink channel in a second serving cell; and a transmission unit configured to perform the above one or multiple pieces of first channel state information report, and to perform the above multiple second channel state information reports. In a case that the total number of the one or multiple first channel state information reports and the multiple second channel state information reports in a first subframe exceeds a first certain number, of the one or multiple first channel state information reports and the multiple second channel state information reports, a second certain number of channel state information reports are not updated where the second certain number may be a number obtained by subtracting the first certain number from the total of the number of the one or multiple first channel state information reports and the number of the multiple second channel state information reports.

(30) In the above ninth aspect, the one or multiple first channel state information reports may be a Periodic channel state information reports or an Aperiodic channel state information reports, and the multiple second channel state information reports may be Periodic channel state information reports or Aperiodic channel state information reports.

(31) In the above ninth aspect, the channel state information reports to be not updated may be determined based on a priority, and the stated priority may be defined based on whether the report is the Periodic channel state information report or the Aperiodic channel state information report.

(32) In the above ninth aspect, the channel state information reports to be not updated may be determined based on a priority of a cell group, and the stated cell groups may be a first cell group including a primary cell and a second cell group not including the primary cell.

(32) In the above ninth aspect, the reception unit may receive from the base station device third information for one or multiple third channel state information reports on a physical uplink channel in the first serving cell, and the transmission unit may perform the above third channel state information report. In a case that the first channel state information report collides with the third channel state information report in a second subframe, all the channel state information reports of one of the first channel state information reports and the third channel state information reports may be dropped. One of the first channel state information report and the third channel state information report may be a Periodic channel state information report while the other one of the first channel state information report and the third channel state information report may be an Aperiodic channel state information report.

(33) A terminal device 1 according to a tenth aspect of the present invention may include: a reception unit configured to receive from a base station device first information for transmission of one or multiple pieces of first channel state information corresponding to one or multiple first channel state information processes on a physical uplink channel in a first serving cell, and to receive from the base station device second information for transmission of multiple pieces of second channel state information corresponding to multiple second channel state information processes on a physical uplink channel in a second serving cell; and a transmission unit configured to transmit the above one or multiple pieces of first channel state information, and to transmit the multiple pieces of second channel state information. In a case that the total number of the one or multiple first channel state information processes and the multiple second channel state information processes exceeds a first certain number in a first subframe where the transmission of the one or multiple pieces of first channel state information collides with the transmission of the multiple pieces of second channel state information, of the one or multiple first channel state information processes and the multiple second channel state information processes, channel state information corresponding to a second certain number of channel state information processes is not updated where the second certain number may be a number obtained by subtracting the first certain number from the total of the number of the one or multiple first channel state information processes and the number of the multiple second channel state information processes.

(34) In the above tenth aspect, the one or multiple first channel state information reports may be a Periodic channel state information reports or an Aperiodic channel state information reports, and the multiple second channel state information reports may be Periodic channel state information reports or Aperiodic channel state information reports.

(35) In the above tenth aspect, the channel state information reports to be not updated may be determined based on a priority, and the priority may be defined based on whether the report is the Periodic channel state information report or the Aperiodic channel state information report.

(36) In the above tenth aspect, the channel state information reports to be not updated may be determined based on a priority of a cell group, and the cell groups may be a first cell group including a primary cell and a second cell group not including the primary cell.

(37) In the above tenth aspect, the reception unit may receive from the base station device third information for one or multiple third channel state information reports corresponding to one or multiple third channel state information processes on a physical uplink channel in the first serving cell, and the transmission unit may perform the above third channel state information report. In a case that the first channel state information report collides with the third channel state information report in a second subframe, all the channel state information reports of one of the first channel state information reports and the third channel state information reports may be dropped. One of the first channel state information report and the third channel state information report may be a Periodic channel state information report while the other one of the first channel state information report and the third channel state information report may be an Aperiodic channel state information report.

According to the above, the uplink control information can be transmitted efficiently.

A program running on each of the base station device 3 and the terminal device 1 according to some aspects of the present invention may be a program that controls a Central Processing Unit (CPU) and the like (a program for causing a computer to operate) in such a manner as to realize the functions according to the above-described embodiments of the present invention. The information handled in these devices is temporarily stored in a Random Access Memory (RAM) while being processed. Thereafter, the information is stored in various types of Read Only Memories (ROMs) such as a flash ROM, a Hard Disk Drive (HDD) or the like, and when necessary, is read out by the CPU to be modified or rewritten.

Moreover, the terminal device 1 and the base station device 3 according to the above-described embodiments may be partially realized by the computer. This configuration may be realized by recording a program for realizing such control functions on a computer-readable medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiments can be realized as an aggregation (a device group) constituted of multiple devices. Each of devices constituting the device group may be equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can also communicate with the base station device as the aggregation.

Furthermore, the base station device 3 according to the above-described embodiments may be an Evolved Universal Terrestrial Radio Access Network (EUTRAN). Furthermore, the base station device 3 according to the above-described embodiments may have some or all portions of the function of a node higher than eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the terminal device is described as one example of a communication device, but the present invention is not limited to this, and can be applied to a fixed-type or a stationary-type electronic apparatus installed indoors or outdoors, for example, a terminal device or a communication device, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

INDUSTRIAL APPLICABILITY

Some aspects of the present invention can apply to a terminal device, a base station device, a communication method, an integrated circuit, and the like, which are demanded to efficiently perform reporting of the channel state information of uplink.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Channel State Information report control unit
3011 Radio resource control unit
3013 Scheduling unit
3015 Channel State Information report control unit

The invention claimed is:

1. A terminal device comprising:
reception circuitry configured to receive, from a base station device, information for one or more first channel state information (CSI) reports and for one or more second CSI reports; and
transmission circuitry configured to transmit the one or more first CSI reports and the one or more second CSI reports, wherein
in a case that a total of a number of the one or more first CSI reports and a number of the one or more second CSI reports exceeds a first number, at least the first number of CSI reports among the one or more first CSI reports and the one or more second CSI reports are updated,
the one or more first CSI reports are one or more aperiodic CSI reports and the one or more second CSI reports are one or more periodic CSI reports, and
the CSI reports to be updated are determined based on a priority, and the priority is defined based on whether each of the CSI reports is an aperiodic CSI report or a periodic CSI report.

2. A base station device comprising:
transmission circuitry configured to transmit, to a terminal device, information for one or more first channel state information (CSI) reports and for one or more second CSI reports; and
reception circuitry configured to receive the one or more first CSI reports and the one or more second CSI reports, wherein
in a case that a total of a number of the one or more first CSI reports and a number of the one or more second CSI reports exceeds a first number, at least the first number of CSI reports among the one or more first CSI reports and the one or more second CSI reports are updated,
the one or more first CSI reports are one or more aperiodic CSI reports and the one or more second CSI reports are one or more periodic CSI reports, and
the CSI reports to be updated are determined based on a priority, and the priority is defined based on whether each of the CSI reports is an aperiodic CSI report or a periodic CSI report.

3. A communication method for a terminal device, the method comprising:
receiving, from a base station device, information for one or more first channel state information (CSI) reports and for one or more second CSI reports; and
transmitting the one or more first CSI reports and the one or more second CSI reports, wherein
in a case that a total of a number of the one or more first CSI reports and a number of the one or more second CSI reports exceeds a first number, at least the first number of CSI reports among the one or more first CSI reports and the one or more second CSI reports are updated by the terminal device,
the one or more first CSI reports are one or more aperiodic CSI reports and the one or more second CSI reports are one or more periodic CSI reports, and
the CSI reports to be updated are determined based on a priority, and the priority is defined based on whether each of the CSI reports is an aperiodic CSI report or a periodic CSI report.

4. A communication method for a base station device, the method comprising:
transmitting, to a terminal device, information for one or more first channel state information (CSI) reports and for one or more second CSI reports; and
receiving the one or more first CSI reports and the one or more second CSI reports, wherein
in a case that a total of a number of the one or more first CSI reports and a number of the one or more second CSI reports exceeds a first number, at least the first number of CSI reports among the one or more first CSI reports and the one or more second CSI reports are updated,
the one or more first CSI reports are one or more aperiodic CSI reports and the one or more second CSI reports are one or more periodic CSI reports, and the CSI reports to be updated are determined based on a priority, and the priority is defined based on whether each of the CSI reports is an aperiodic CSI report or a periodic CSI report.

5. The terminal device according to claim 1, wherein a second number of the CSI reports among the one or more first CSI reports and the one or more second CSI reports are dropped.

6. The terminal device according to claim 5, wherein the second number is a number obtained by subtracting the first number from the total of the number of the one or more first CSI reports and the number of one or more second CSI reports.

7. The terminal device according to claim 5, wherein the second number of the CSI reports, which are dropped, comprises CSI reports with a lowest priority.

8. The terminal device according to claim 1, wherein the reception circuitry is further configured to receive, from the base station device, the information for the one or more first CSI reports and for the one or more second CSI reports via RRC signaling.

9. The terminal device according to claim 1, wherein the one or more first CSI reports and the one or more second CSI reports are CSI reports on a physical uplink channel.

10. The terminal device according to claim 1, wherein the transmission circuitry is further configured to transmit aperiodic CSI reports using a physical uplink shared channel (PUSCH) and/or transmit periodic CSI reports using a physical uplink control channel (PUCCH) or PUSCH.

11. The terminal device according to claim 1, wherein the priority is determined based on a rule prioritizing aperiodic CSI reports over periodic CSI reports.

12. The terminal device according to claim 1, wherein the at least first number of the CSI reports, which are updated, comprises CSI reports with a highest priority.

13. The base station device according to claim 2, wherein a second number of the CSI reports among the one or more first CSI reports and the one or more second CSI reports, which are dropped, are the CSI reports with lowest priorities.

14. The base station device according to claim 2, wherein the transmission circuitry is further configured to transmit, to the terminal device, the information for the one or more first CSI reports and the one or more second CSI reports via RRC signaling.

15. The base station device according to claim 2, wherein the one or more first CSI reports and the one or more second CSI reports are CSI reports on a physical uplink channel.

16. The base station device according to claim 2, wherein the reception circuitry is further configured to receive aperiodic CSI reports using a physical uplink shared channel (PUSCH) and/or receive periodic CSI reports using a physical uplink control channel (PUCCH) or PUSCH.

17. The base station device according to claim 2, wherein the priority is determined based on a rule prioritizing aperiodic CSI reports over periodic CSI reports.

18. The base station device according to claim 2, wherein the at least first number of the CSI reports, which are updated, comprises the CSI reports with a highest priority.

* * * * *

UNITED STATES PATENT AND TRADEMARK OFFICE
CERTIFICATE OF CORRECTION

PATENT NO. : 12,047,800 B2
APPLICATION NO. : 17/500226
DATED : July 23, 2024
INVENTOR(S) : Kazunari Yokomakura et al.

Page 1 of 1

It is certified that error appears in the above-identified patent and that said Letters Patent is hereby corrected as shown below:

On the Title Page

Column 1 between Item (63) and Item (51) Please add Item (30) as follows:
(30) Foreign Application Priority Data
Aug. 6, 2015 (JP).......................2015-155578

Signed and Sealed this
Twenty-fourth Day of September, 2024

Katherine Kelly Vidal
*Director of the United States Patent and Trademark Office*